United States Patent [19]
Christie

[11] Patent Number: 6,104,718
[45] Date of Patent: Aug. 15, 2000

[54] METHOD, SYSTEM AND APPARATUS FOR TELECOMMUNICATIONS CONTROL

[75] Inventor: Joseph Michael Christie, San Bruno, Calif.

[73] Assignee: Sprint Communications Company, L.P., Kansas City, Mo.

[21] Appl. No.: 09/081,891

[22] Filed: May 20, 1998

Related U.S. Application Data

[63] Continuation of application No. 08/568,551, Dec. 7, 1995, Pat. No. 5,825,780, which is a continuation of application No. 08/238,605, May 5, 1994, abandoned.

[51] Int. Cl.[7] .............................. H04L 12/28; H04L 12/56
[52] U.S. Cl. .............................................. 370/410; 370/395
[58] Field of Search ........................................ 370/351, 389, 370/395, 396–399, 400, 410, 422, 360, 392, 398, 409, 522; 379/201, 207, 94, 220, 221, 112

[56] References Cited

U.S. PATENT DOCUMENTS

| | | |
|---|---|---|
| 4,201,889 | 5/1980 | Lawrence et al. . |
| 4,310,727 | 1/1982 | Lawser . |
| 4,348,554 | 9/1982 | Asmuth . |
| 4,453,247 | 6/1984 | Suzuki et al. . |
| 4,554,659 | 11/1985 | Blood et al. . |
| 4,565,903 | 1/1986 | Riley . |
| 4,683,563 | 7/1987 | Rouse et al. . |
| 4,730,312 | 3/1988 | Johnson . |
| 4,736,364 | 4/1988 | Basso et al. . |
| 4,748,658 | 5/1988 | Gopal et al. . |
| 4,823,338 | 4/1989 | Chan et al. . |
| 4,853,955 | 8/1989 | Thorn et al. . |
| 4,895,319 | 1/1990 | Lidinsky et al. . |
| 4,896,319 | 1/1990 | Lidinsky et al. . |
| 4,916,690 | 4/1990 | Barri . |
| 4,926,416 | 5/1990 | Weik . |
| 4,979,118 | 12/1990 | Kheradpir . |

(List continued on next page.)

FOREIGN PATENT DOCUMENTS

| | | |
|---|---|---|
| 23853/92 | 3/1993 | Australia . |
| 870284896 | 5/1989 | European Pat. Off. . |
| 0403414 A2 | 12/1990 | European Pat. Off. . |
| 0426911 A1 | 5/1991 | European Pat. Off. . |
| 90312739 | 7/1991 | European Pat. Off. . |
| 91303312 | 10/1991 | European Pat. Off. . |
| 0460843 A2 | 12/1991 | European Pat. Off. . |
| 0466078 A2 | 1/1992 | European Pat. Off. . |
| 0482773 A1 | 4/1992 | European Pat. Off. . |
| 91311342 | 7/1992 | European Pat. Off. . |
| 0539016 A2 | 4/1993 | European Pat. Off. . |
| 0549016 A1 | 6/1993 | European Pat. Off. . |
| 92307752 | 9/1993 | European Pat. Off. . |
| 0582418 A2 | 2/1994 | European Pat. Off. . |
| 0592152 A2 | 4/1994 | European Pat. Off. . |
| 592153 A2 | 4/1994 | European Pat. Off. . |
| 592154 A2 | 4/1994 | European Pat. Off. . |
| 4225203 A1 | 12/1992 | Germany . |
| 07050057 | 9/1996 | Japan . |
| WO 94/06251 | 3/1991 | WIPO . |
| WO 93/18598 | 9/1993 | WIPO . |
| WO 95/04436 | 2/1995 | WIPO . |

OTHER PUBLICATIONS

Barr, W.J., et al., The TINA Initiative, IEEE Communications Magazine, vol. 31, No. 3, Mar. 1993, New York (US), pp. 70–76, Mar. 1993.

Chen, S., et al., Intelligent Networking For The Global Marketplace, IEEE Communications Magazine, vol. 31, No. 3, Mar. 1993, New York (US), pp. 86–92.

(List continued on next page.)

*Primary Examiner*—Ajit Patel
*Attorney, Agent, or Firm*—Harley R. Ball

[57] ABSTRACT

The present invention includes a method, system, and apparatus for providing communication control. The invention includes a method in which signaling is processed externally to a switch before it is applied by the network elements. The processor is able to select network characteristics and signal the network elements based the selections. A network employing the processing method is also included, as well as a signaling system that employs the processing method.

10 Claims, 8 Drawing Sheets

U.S. PATENT DOCUMENTS

| | | |
|---|---|---|
| 4,985,889 | 1/1991 | Frankish et al. . |
| 4,991,204 | 2/1991 | Yamamoto et al. . |
| 4,993,014 | 2/1991 | Gordon . |
| 4,993,104 | 2/1991 | Gordon . |
| 5,003,584 | 3/1991 | Benyacar et al. . |
| 5,018,191 | 5/1991 | Catron et al. . |
| 5,036,318 | 7/1991 | Bachhuber et al. . |
| 5,048,081 | 9/1991 | Gavaras et al. . |
| 5,058,104 | 10/1991 | Yonehara et al. . |
| 5,067,123 | 11/1991 | Hyodo et al. . |
| 5,084,867 | 1/1992 | Tachibana et al. . |
| 5,086,461 | 2/1992 | Thorn et al. . |
| 5,089,954 | 2/1992 | Rago . |
| 5,091,903 | 2/1992 | Schrodi . |
| 5,101,404 | 3/1992 | Kunimoto et al. . |
| 5,108,191 | 4/1992 | Catron et al. . |
| 5,115,431 | 5/1992 | Williams et al. . |
| 5,163,057 | 11/1992 | Grupp . |
| 5,168,492 | 12/1992 | Beshai et al. . |
| 5,179,556 | 1/1993 | Turner . |
| 5,185,743 | 2/1993 | Murayama et al. . |
| 5,193,110 | 3/1993 | Jones et al. . |
| 5,204,857 | 4/1993 | Obara . |
| 5,216,669 | 6/1993 | Hofstetter et al. . |
| 5,218,602 | 6/1993 | Grant et al. . |
| 5,231,631 | 7/1993 | Buhrke et al. . |
| 5,231,633 | 7/1993 | Hluchyi et al. . |
| 5,233,607 | 8/1993 | Barwig et al. . |
| 5,239,539 | 8/1993 | Uchida et al. . |
| 5,239,542 | 8/1993 | Breidenstein et al. . |
| 5,249,178 | 9/1993 | Kurano et al. . |
| 5,251,255 | 10/1993 | Epley . |
| 5,253,247 | 10/1993 | Hirose et al. . |
| 5,255,266 | 10/1993 | Watanabe et al. . |
| 5,258,752 | 11/1993 | Fukaya et al. . |
| 5,258,979 | 11/1993 | Oomuro et al. . |
| 5,268,895 | 12/1993 | Topper . |
| 5,271,010 | 12/1993 | Miyake et al. . |
| 5,274,680 | 12/1993 | Sorton et al. . |
| 5,278,889 | 1/1994 | Papanicolaou et al. ............... 379/53 |
| 5,282,244 | 1/1994 | Fuller et al. . |
| 5,285,441 | 2/1994 | Bansal et al. . |
| 5,291,479 | 3/1994 | Vaziri et al. . |
| 5,291,492 | 3/1994 | Andrews et al. . |
| 5,306,318 | 4/1994 | Bachhuber et al. . |
| 5,311,509 | 5/1994 | Heddes et al. . |
| 5,317,562 | 5/1994 | Nardin et al. . |
| 5,323,389 | 6/1994 | Bitz et al. . |
| 5,327,421 | 7/1994 | Hiller et al. . |
| 5,327,433 | 7/1994 | Hall . |
| 5,329,308 | 7/1994 | Binns et al. ............................ 455/3.1 |
| 5,339,818 | 8/1994 | Tanaka et al. . |
| 5,345,443 | 9/1994 | D'Ambrogio et al. . |
| 5,345,445 | 9/1994 | Hiller . |
| 5,345,446 | 9/1994 | Hiller et al. . |
| 5,357,510 | 10/1994 | Norizuki et al. . |
| 5,363,433 | 11/1994 | Isono . |
| 5,365,524 | 11/1994 | Hiller et al. . |
| 5,367,566 | 11/1994 | Moe et al. . |
| 5,373,504 | 12/1994 | Tanaka . |
| 5,375,124 | 12/1994 | D'Ambrogio . |
| 5,377,186 | 12/1994 | Wegner et al. . |
| 5,384,771 | 1/1995 | Isidoro et al. . |
| 5,384,840 | 1/1995 | Blatchford et al. . |
| 5,392,402 | 2/1995 | Robrock . |
| 5,394,393 | 2/1995 | Brisson et al. . |
| 5,394,398 | 2/1995 | Rau . |
| 5,400,339 | 3/1995 | Sekine et al. . |
| 5,414,701 | 5/1995 | Shtayer et al. . |
| 5,418,783 | 5/1995 | Yamaki et al. . |
| 5,420,857 | 5/1995 | Jurkevich . |
| 5,420,858 | 5/1995 | Marshall et al. . |
| 5,420,916 | 5/1995 | Sekiguchi . |
| 5,422,882 | 6/1995 | Hiller et al. . |
| 5,425,090 | 6/1995 | Orriss . |
| 5,426,636 | 6/1995 | Hiller et al. . |
| 5,428,607 | 6/1995 | Hiller et al. . |
| 5,428,609 | 6/1995 | Eng et al. . |
| 5,434,852 | 7/1995 | La Porta et al. . |
| 5,434,981 | 7/1995 | Lenihan et al. . |
| 5,440,563 | 8/1995 | Isidoro et al. . |
| 5,440,626 | 8/1995 | Boyle et al. . |
| 5,444,713 | 8/1995 | Backaus et al. . |
| 5,446,738 | 8/1995 | Kim et al. . |
| 5,452,297 | 9/1995 | Hiller et al. . |
| 5,453,981 | 9/1995 | Katsube et al. . |
| 5,454,034 | 9/1995 | Martin . |
| 5,457,684 | 10/1995 | Bharucha . |
| 5,461,669 | 10/1995 | Vilian . |
| 5,463,620 | 10/1995 | Sriram . |
| 5,463,621 | 10/1995 | Suzuki . |
| 5,473,677 | 12/1995 | D'Amato et al. . |
| 5,473,679 | 12/1995 | La Porta et al. . |
| 5,477,537 | 12/1995 | Dankert et al. . |
| 5,479,401 | 12/1995 | Bitz et al. . |
| 5,479,402 | 12/1995 | Hata et al. . |
| 5,479,495 | 12/1995 | Blumhardt . |
| 5,483,527 | 1/1996 | Doshi et al. . |
| 5,485,455 | 1/1996 | Dobbins et al. . |
| 5,495,484 | 2/1996 | Self et al. . |
| 5,504,742 | 4/1996 | Kakuma et al. . |
| 5,506,844 | 4/1996 | Rao . |
| 5,509,010 | 4/1996 | La Porta et al. . |
| 5,509,123 | 4/1996 | Dobbins et al. . |
| 5,513,178 | 4/1996 | Tanaka . |
| 5,519,707 | 5/1996 | Subramanian et al. . |
| 5,521,910 | 5/1996 | Matthews . |
| 5,522,042 | 5/1996 | Fee et al. . |
| 5,526,414 | 6/1996 | Bedard et al. . |
| 5,533,106 | 7/1996 | Blumhardt . |
| 5,539,698 | 7/1996 | Kozaki et al. . |
| 5,539,815 | 7/1996 | Samba . |
| 5,539,816 | 7/1996 | Pinard et al. . |
| 5,539,884 | 7/1996 | Robrock, II . |
| 5,541,918 | 7/1996 | Ganmukhi et al. . |
| 5,541,926 | 7/1996 | Saito et al. . |
| 5,544,152 | 8/1996 | Obermanns et al. . |
| 5,544,161 | 8/1996 | Bigham et al. . |
| 5,548,580 | 8/1996 | Buckland . |
| 5,550,819 | 8/1996 | Duault . |
| 5,550,834 | 8/1996 | D'Ambrogio et al. . |
| 5,550,914 | 8/1996 | Clarke et al. . |
| 5,563,939 | 10/1996 | La Porta et al. . |
| 5,566,173 | 10/1996 | Steinbrecher . |
| 5,568,475 | 10/1996 | Doshi . |
| 5,570,368 | 10/1996 | Murakami et al. . |
| 5,577,039 | 11/1996 | Won et al. . |
| 5,579,311 | 11/1996 | Chopping et al. . |
| 5,587,999 | 12/1996 | Endo . |
| 5,592,477 | 1/1997 | Farris et al. . |
| 5,600,640 | 2/1997 | Blair et al. . |
| 5,600,643 | 2/1997 | Robrock, II . |
| 5,627,836 | 5/1997 | Conoscenti et al. . |
| 5,629,930 | 5/1997 | Beshai et al. . |
| 5,635,980 | 6/1997 | Lin et al. . |
| 5,636,210 | 6/1997 | Agrawal . |
| 5,640,446 | 6/1997 | Everett et al. . |
| 5,661,725 | 8/1997 | Buck . |
| 5,666,349 | 9/1997 | Petri . |
| 5,673,262 | 9/1997 | Shimizu . |
| 5,680,390 | 10/1997 | Robrock, II . |
| 5,703,876 | 12/1997 | Christie . |

| | | |
|---|---|---|
| 5,708,702 | 1/1998 | DePaul et al. . |
| 5,710,769 | 1/1998 | Anderson et al. . |
| 5,719,863 | 2/1998 | Hummel . |
| 5,751,706 | 5/1998 | Land . |
| 5,825,780 | 10/1998 | Christie . |

OTHER PUBLICATIONS

Fujioka, M., et al., Hierarchical And Distributed Information Handling For UPT, IEEE Network Magazine, Nov., 1990.

Gilmour, J., et al., Intelligent Network/2: The Architecture—The Technical Challenges—The Opportunities, IEEE Communications Magazine, vol. 26, No. 12, Dec. 1988, New York (US, pp. 8–11 and 63.

Weisser, F. J., et al., The Intelligent Network And Forward–Looking Technology, IEEE Communications Magazine, vol. 26, No. 12, Dec. 1988, New York (US), pp. 64–69.

General Recommendations On Telephone Switching And Signaling Intelligent Network—Intelligent Network Distributed Functional Plane Architecture, Q.1204, ITU–T—Mar., 1993.

General Recommendations On Telephone Switching And Signaling Intelligent Network—Intelligent Network Physical Plane Architecture Q.1205, ITU–T Recommendation, Telecommunication Standardization Sector of ITU.

Rec. I. 312, "ISDN—Principles Of Intelligent Network Architecture." ITU—Telecommunication Standardization Sector, Oct., 1992.

Rec. Q. 1200. "General Recommendations On Telephone Switching and Signaling–Intelligent Network—Q–Series Intelligent Network Recommendation Structure." ITU—Telecommunication Standardization Sector, Mar., 1993.

Rec. Q. 1218, "General Recommendations On Telephone Switching And Signaling–Intelligent Network—Interface Recommendation For Intelligent Network CS–1." ITU—Telecommunication Standardization Sector, Mar., 1993.

"Report Of The Meeting Of SWP 13/1–4", Study Group 13, Temporary Document 46 (13/1), ITUT, Mar., 1994.

"Interworking B–ISUP and Q.93B for DDI, MSN, TP and SUB", Study Group 11, Temporary Document 2/II–131I, ITU—Telecommunication Standardization Sector, Nov. 29–Dec. 17, 1993.

"Final B–ISUP SDLS", Study Group 11, Temporary Document 11/2–53–C, ITU—Telecommunication Standardization Sector, Nov. 29–Dec. 17, 1993.

"Annexes B, C, D, F, H and I OF Q.2931", Study Group 11, Temporary Document 2/II–27 C, ITU—Telecommunication Standardization Sector, Nov. 29–Dec. 17, 1993.

"General Recommendations On Telephone Switching And Signaling", ITU–T Recommendation Q.1214, ITU—Telecommunication Standardization Sector, Mar., 1993.

Mckinney, Scott, ATM for Narrowband Services, 2460 IEEE Communications Magazine, Apr. 1994, New York (US), pp. 64–72.

N/A, "Intelligent Network/2: A flexible framework for exchange services," Bell Communications Research Exchange, vol. 3 (No. 3), (May 23, 1987).

N/A, "Communications for the Information Age," Globecom '88, Conference Record, (Nov. 28, 1988).

N/A, "Toward a Broadband Congestion Control Strategy," IEEE Network, The Magazine of Computer Communications, (May 23, 1990).

N/A, "Personal Communications Services and the Intelligent Network," British Telecommunications Engineering, (Aug. 23, 1990).

N/A, "Universal Service Creation and Provision Environment for Intelligent Network," IEEE Communications Magazine, (Jan. 23, 1991).

N/A, "Switching in a Competitive Market," IEEE Communications Magazine, (Jan. 23, 1991).

N/A, "Network Signaling," Telephony, TCX12004, University of Excellence, pp. 5.8–5.17, (Oct. 21, 1991).

Garrahan, J.J., et al., "Intelligent Network Overview," IEEE Communications Magazine, pp. 30–36, (Mar. 23, 1993).

Johnson, M.A., et al., "New Service Testing Functions for Advanced Intelligent Networks," IEEE 1992 Network Operations and Management Symposium, pp. 709–720, (Apr. 23, 1992).

Woodworth, Clark B., et al., "A Flexible Broadband Packet Switch for a Multimedia Integrated Network," International Conference on Communications, ICC–91, pp. 3.2.1–3.2.8, (Jun. 23, 1991).

Faynberg, I., et al., "The Support of Network Interworking and Distributed Context Switching in the IN Service Data Function Model," 2nd Colloque International, ICIN 92, pp. 11–16, (Mar. 23, 1992).

Minzer, Steven, "A Signaling Protocol for Complex Multimedia Services," IEEE Journal on Selected Areas in Communications (ISSN 0733–8716), vol. 9 (No. 9), pp. 1383–1394, (Dec. 23, 1991).

Fukazawa, M., et al., "Intelligent Network Call Model for Broadband ISDN," Fujitsu Laboratories Ltd. (Japan), pp. 30.6.1–30.6.5.

Ohta, S., et al., "A Dynamically Controllabel ATM Transport Network Based on the Virtual Path Concept," Communications for the Information Age, Globecom '88, Conference Record, pp. 1272–1276, (Nov. 28, 1988).

Yoshikai, N., et al., "General Arrangements For Interworking Between B–ISDN and 64kbit/s Based ISDN (Draft Recommendation I.580), Study Group 13," ITU–T Telecommunication Standardization Sector, pp. 1–51, (Mar. 7, 1994).

N/A, "Final Draft Text For Broadband Capability Set 2 Signalling Requirements, Study Group 11, Attachment "D" Special Drafting Meeting," ITU–T Telecommunication Standardization Sector, pp. 1–127, (Sep. 13, 1993).

Christie, Joseph M., "Broadband Telecommunications System," 08/525,897.

Christie, Joseph M., "System for Managing Telecommunications," 08/525,050.

N/A, "A Technical Report on Speech Packetization, Document T1A1/94—Prepared By T1A1.7, Working Group on Specialized Signal Processing.".

McDysan, David E. and Spohn, Darren L., "ATM Theory and Application, ATM Layer VPI/VCI Level Addressing," pp. 256: 9.3.1, (Apr. 23, 1994).

Minoli, Daniel, "Principles of Signaling for Cell Relay and Frame Relay," DVI Communications, Inc./Stevens Institute of Technology and Dobrowski, George/Bell Communications Research (Bellcore), pp. 1–2, 5–6, and 229, (Apr. 23, 1994).

Jordan, D.S., "Bell Operating Company Intelligent Voice Networks and Services, Proceedings of the National Communications Forum," Bell Communications Research, (Oct. 7, 1985).

N/A, "IN/B–ISDN Signalling Three Ways of Integration, Study Group 11," ITU—Telecommunication Standardization Sector, (Nov. 29, 1993).

N/A, "Interworking B–ISUP and Q.93B for DDI, MSN, TP and SUB, Study Group 11," ITU—Telecommunication Standardization Sector, (Nov. 29, 1993).

N/A, "Revised Draft of Q.2650 (DSS2/B ISUP) Interworking Recommendation, Study Group 11," ITU—Telecommunication Standardization Sector, (Nov. 29, 1993).

N/A, "Draft Broadband/Narrowband NNI Interworking Recommendation, Study Group 11," ITU—Telecommunication Standardization Sector, (Dec. 23, 1993).

N/A, "Draft Recommendation Q.2761, Study Group 11," ITU—Telecommunication Standardization Sector, (Nov. 29, 1993).

N/A, "Q.2931 Overview," ITU—Telecommunication Standardization Sector, p. 5.8–5.17, (Nov. 29, 1993).

N/A, "Clean final draft text for B–ISUP formats and codes (Q.2763) in ASN.1, Study Group 11," ITU—Telecommunication Standardization Sector, (Nov. 29, 1993).

N/A, "Updated draft of Q.2764, Study Group 11," ITU—Telecommunication Standardization Sector, (Nov. 29, 1993).

N/A, "Final B–ISUP SDLs, Study Group 11," ITU—Telecommunication Standardization Sector, (Nov. 29, 1993).

N/A, "Draft Recommendation Q.2650, Study Group 11," ITU—Telecommunication Standardization Sector, (Nov. 29, 1993).

N/A, "Revised Draft of Q.2650 (DSS2/B–ISUP Interworking Recommendation), Study Group 11," ITU—Telecommunication Standardization Sector, (Nov. 29, 1993).

N/A, "Revision of Recommendation of Q.850," ITU–T SG 11 WP 2, (Dec. 2, 1993).

N/A, "Draft Text for Q.2931 (CH. 1, 2 and 3), Study Group 11," ITU—Telecommunication Standardization Sector, (Dec. 23, 1993).

N/A, "Q.2931, Clause 4—Information Elements," ITU—Telecommunication Standardization Sector, (Nov. 29, 1993).

N/A, "Section 5 of Q.93B, Study Group 11," ITU—Telecommunication Standardization Sector, (Nov. 29, 1993).

N/A, "Chapter 6 of Recommendation Q.93B, Study Group 11," ITU—Telecommunication Standardization Sector, (Nov. 29, 1993).

N/A, "Clauses 7 and 8 of Q.2931, Study Group 11," ITU—Telecommunication Standardization Sector, (Dec. 23, 1993).

N/A, "Revised Q.2931 User Side SDL Diagrams, Study Group 11," ITU—Telecommunication Standardization Sector, (Nov. 29, 1993).

N/A, "Revised Q.2931 Network Side SDL Diagrams, Study Group 11," ITU—Telecommunication Standardization Sector, (Nov. 29, 1993).

N/A, "Annexes B, C, D, F, H and I of Q.2931, Study Group 11," ITU—Telecommunication Standardization Sector, (Nov. 29, 1993).

N/A, "Annex E of Recommendation Q.93B, Study Group 11," ITU—Telecommunication Standardization Sector, (Nov. 29, 1993).

N/A, "Rec. Q.2931, Annex G—Status Monitoring of SPCs, Study Group 11," ITU—Telecommunication Standardization Sector, (Nov. 29, 1993).

N/A, "Annex J of Q.2931, Study Group 11," ITU—Telecommunication Standardization Sector, (Dec. 23, 1993).

N/A, "Appendix 1/Q.2931: Guidelines for the Use of Instruction Indicators, Study Group 11," ITU—Telecommunication Standardization Sector, (Nov. 29, 1993).

N/A, "Draft text for Q.2931: Appendix II (Information Items Required for Connection Establishment and Routing in B–ISDN), Study Group 11," ITU—Telecommunication Standardization Sector.

N/A, "General Recommendations on Telephone Switching and Signalling—Intelligent Network / Distributed Functional Plane for Intelligent Network CS–1, ITU–T Recommendation Q.1214," ITU—Telecommunication Standardization Sector.

N/A, "Draft Recommendation Q.2762, Study Group 11," ITU—Telecommunication Standardization Sector, (Nov. 29, 1993).

Yoshikai, N., et al., "Report of the Meeting of SWP 13/1–4 (Draft Recommendation I.580)," ITU—Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Minzer, Steven, "A Signaling Protocol for Complex Multimedia Services," IEEE Journal on Selected Areas in Communications (ISSN 0733–8716), vol. 9 (No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research Exchange, vol. 3 (No. 3), (May/Jun. 1987).

Cooper, C., et al., "Toward a Broadband Congestion Control Strategy," IEEE Network, The Magazine of Computer Communications, (May 1990).

Batten, A., "Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "Race 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324 (1988).

N/A, "ANSI–TI.111–1992, Signaling System No. 7 (SS7)—Message Transfer Part (MTP)," American National Standard for Telecommunications.

N/A, "ANSI–TI.112–1992, Signaling System No. 7 (SS7)—Signaling Connection Control Part (SCCP)," American National Standard for Telecommunications.

N/A, "ANSI–TI.113–1992, Signaling System No. 7 (SS7)—Integrated Services digital Network (ISDN) User Part," American National Standard for Telecommunications.

N/A, "ANSI–TI.113a–1993, Signaling System No. 7 (SS7)—Integrated Services Digital Network (ISDN) User Part, (NxDSO Multi–rate Connection)," American National Standard for Telecommunications.

N/A, "ANSI–TI.113–1995, Signaling System No. 7 (SS7)—Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecommunicazioni S.p.A., (1993).

N/A, "A Technical Report on Speech Packetization," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," TEKELEC, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc. /Stevens Institute of Technology / Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revision of Recommendation of Q.850," ITU–T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "General Recommendations on Telephone Switching and Signalling—Intelligent Network / Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration—ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modifications for Draft New ITU–T Recommendation I.731," ITU—Telecommunication Standardization Sector, Study Group 15, (Nov. 13–24, 1995).

Buhrke, R.E., "Proposed Unified Functional Model," T1S1.5/95–036, Committee T1 Contribution, (Feb. 1995).

U.S. application No. 08/562,206, filed Nov. 22, 1995.
U.S. application No. 08/568,551, filed Dec. 07, 1995.
U.S. application No. 08/613,953, filed Mar. 11, 1996.
U.S. application No. 08/921,874, filed Sep. 02, 1997.
U.S. application No. 09/081,891, filed May 20, 1998.
U.S. application No. 09/123,162, filed Jul. 27, 1998.
U.S. application No. 09/216,354, filed Dec. 18, 1998.
U.S. application No. 09/218,817, filed Dec. 22, 1998.
U.S. application No. 09/218,820, filed Dec. 22, 1998.
U.S. application No. 09/219,095, filed Dec. 22, 1998.
U.S. application No. 09/219,096, filed Dec. 22, 1998.
U.S. application No. 09/219,125, filed Dec. 22, 1998.
U.S. application No. 09/219,135, filed Dec. 22, 1998.
U.S. application No. 09/243,203, filed Feb. 02, 1999.
U.S. application No. 09/272,131, filed Mar. 19, 1999.
U.S. application No. 09/272,454, filed Mar. 19, 1999.
U.S. application No. 09/272,655, filed Mar. 18, 1999.
U.S. application No. 09/272,698, filed Mar. 18, 1999.
U.S. application No. 09/272,932, filed Mar. 18, 1999.
U.S. application No. 09/276,042, filed Mar. 25, 1999.
U.S. application No. 09/276,217, filed Mar. 25, 1999.
U.S. application No. 09/276,290, filed Mar. 25, 1999.
U.S. application No. 09/276,601, filed Mar. 25, 1999.
U.S. application No. 09/353,401, filed Jul. 15, 1999.
U.S. application No. 09/392,489, filed Sep. 09, 1999.
U.S. application No. 09/413,734, filed Oct. 06, 1999.
U.S. application No. 09/420,712, filed Oct. 20, 1999.
U.S. application No. 09/420,914, filed Oct. 20, 1999.
U.S. application No. 09/421,718, filed Oct. 20, 1999.
U.S. application No. 09/438,668, filed Nov. 12, 1999.
U.S. application No. 09/438,669, filed Nov. 12, 1999.
U.S. application No. 09/438,807, filed Nov. 12, 1999.
U.S. application No. 09/439,033, filed Nov. 12, 1999.
U.S. application No. 09/442,659, filed Nov. 18, 1999.
U.S. application No. 09/452,765, filed Dec. 01 1999.
U.S. application No. 09/464,295, filed Dec. 15, 1999.

METHOD, SYSTEM AND APPARATUS FOR TELECOMMUNICATIONS CONTROL

RELATED APPLICATIONS

This application is a continuation of application Ser. No. 08/568,551, filed on Dec. 7, 1995, now U.S. Pat. No. 5,825,780, which is a continuation of U.S. patent application Ser. No. 08/238,605, filed on May 5, 1994 and now abandonded. U.S. patent application Ser. Nos. 08/238,605 and 08/568,551 are hereby incorporated by reference into this application.

FEDERALLY SPONSORED RESEARCH OR DEVELOPMENT

Not applicable

MICROFICHE APPENDIX

Not applicable

BACKGROUND OF THE INVENTION

1. FIELD OF THE INVENTION

The invention relates to telecommunications and more specifically to communications control processing in telecommunications signaling.

2. Description of the Prior Art

Telecommunications systems establish a communications path between two or more points to allow the transfer of information between the points. The communications path typically comprises a series of connections between network elements. The network elements are typically switches. Switches provide the primary means where different connections are associated to form the communications path. Communication control is the process of setting up a communications path between the points. Communication control comprises the selection of network elements such as switches or other devices which will form part of the communications path. Communication Switches control these selections. Switches select the connections that comprise the communications path. Switches also select the network elements which form an actual part of that communications path. By selecting these network elements, a switch is often selecting the next switch that will make further selections. Switches accomplish communication control.

The correspondence between communication control and a communications path is well known in the art. A common method used in communication control is signaling among switches. One method by which a first point requests a communications path to a second point is by signaling a first switch with an off-hook signal followed by dual tone multifrequency (DTMF) signals. The first switch will typically process those signals and will select other network elements such as a second switch. The first switch signals the second switch and establishes a connection between the switches. The second switch then selects the next network element, signals that network element, and establishes a connection to that network element. This process is well known in the art. The connections and signaling thus proceed from switch to switch through the network until a communications path is established between the first and second points.

Some networks transmit signaling information from the switches to other signaling devices. In these cases, the switches typically must be modified through the use of Signaling Point (SP) hardware and software in order to convert the language of the switch into the language used by these other signaling devices. One signaling device is a Service Control Point (SCP). An SCP processes signaling queries from a switch. An SCP only answers a switch query after the switch has become a part of the communications path. SCPs support the communication control which is directed by the switch.

Additionally, signaling may pass through other signaling devices, such as Signal Transfer Points (STPs), which route the signaling. An STP is typically a high-speed packet data switch which reads portions of the signaling information and either discards or routes the information to a network element. The signal routing operation of the STP is based on the signaling information that is specified by the switch. STPs route signaling information, but STPs do not modify or otherwise process the signaling information. An example of the above described system is Signaling System #7 (SS7) technology. Thus, signaling devices only are used to support switches in communication control.

Broadband systems, such as Asynchronous Transfer Mode (ATM) may use extensions of existing SS7 signaling to allow ATM switches to direct communication control. However, broadband systems may also utilize different communication control methods. ATM switches may transfer ATM cells which contain signaling to other ATM switches. As with the other switch types however, ATM switches also perform the dual task of communication control and forming a part of the communications path.

Some switches use API switching which employs remote central processing units (CPUs). These switches only receive switch information from the remote CPUs and not signaling. The protocols used for information transfer between the switch and the remote CPU are proprietary among vendors and are incompatible between the switches of different vendors.

Some digital cross-connect (DCS) equipment employ centralized control systems. These systems, however, only provide relatively static switching fabrics and do not respond to signaling. Instead of establishing connections in response to signaling, DCS cross-connections are established in response to network configuration needs. Network elements and connections are pre-programmed into the network and are not selected in response to signaling from a point outside of the network.

At present, while communication control and the communications path are distinct from one another, both are dependent on the switch. The performance of both of these tasks by switches places limitations on a telecommunications network. One such limitation can be illustrated by one difficulty encountered in combining narrowband networks and broadband networks. Broadband networks are advantageous for data transmission because virtual permanent connections can be mapped through a network and bandwidth allocated on demand. Narrowband switches are advantageous for voice, in part, due to the many features which have been developed in conjunction with these switches. These features benefit both the user and the network through added efficiency and quality. Examples are "800" platforms, billing systems, and routing systems. However for broadband networks, the development of these features is incomplete and does not provide the functionality of current narrowband features. Unfortunately, narrowband switches do not have the capacity, speed, and multimedia capabilities of broadband switches. The resulting combination is separate overlay networks. Typically, narrowband traffic remains within the narrowband network, and broadband traffic remains within the broadband network.

Any intelligent interface between the two networks would require that signaling information be transmitted between narrowband switches and broadband switches. At present, the ability of these switches to signal each other is limited. These switch limitations create a major obstacle in any attempt to interface the two networks. It would be advantageous if narrowband and broadband networks could interwork through an intelligent interface to establish a communications path between points. At present, the interface between narrowband and broadband networks remains a rigid access pipe between overlay systems.

The reliance on switches to both perform communication control and to form the a part of the communications path results in impediments to developing improved networks. Each time a new network element, such as a broadband switch, is introduced, a telecommunications network may be forced to delay integrating the network element into its network until standardization of signaling and interface protocols are developed for the switches. At present, there is a need for a portion of the communication control processing to be independent of the switches that form a part of the communications path.

SUMMARY

An embodiment of the present invention solves this need by providing a method, system, and apparatus for communication control processing that is located externally to the switches that make the connections. The method includes receiving a first signal into a processor which is located externally to the switches in a network comprised of network elements. The processor selects a network characteristic in response to the first signal. The processor then generates a second signal reflecting the network characteristic and transmits the second signal to at least one network element. This transmission occurs before that network element has applied the first signal. Examples of network characteristics are network elements and connections, but there are others. Examples of signaling are Signaling System #7 or broadband signaling. The processor may also employ information received from the network elements or operational control when making selections. In one embodiment, the method includes receiving the first signal into a network from a point and routing the first signal to the processor.

The present invention also includes a telecommunications processing system which comprises an interface that is external to the switches and is operational to receive and transmit signaling. The processing system also includes a translator that is coupled to the interface and is operational to identify particular information in the received signaling and to generate new signaling based on new information. The processor also includes a processor that is coupled to the translator and is operational to process the identified information from the translator in order to select at least one network characteristic. The processor provides new information to the translator reflecting the selection. The identified information is used in the processor before it is used in the particular network elements that receive the new signaling.

The present invention also includes a telecommunications network comprised of a plurality of network elements wherein at least one network element is a switch, and a plurality of connections between the network elements. The network also includes a processor located externally to the switches which is operable to receive a first signal, to select at least one network characteristic in response to the first signal, and to generate a second signal reflecting the selection. The network also includes a plurality of links between the processor and the network elements which are operable to transmit the second signal to at least one network element before that network element has applied the first signal.

The present invention also includes a telecommunications signaling system for use in conjunction with a plurality of telecommunication switches. This system comprises a plurality of signaling points and a signaling processor. The signaling processor is linked to the signaling points and resides externally to the switches. The signaling processor is operational to process signaling and to generate new signaling information based on the processing. The new signaling is transmitted over the links to multiple signaling points. In one embodiment, the new signaling information is comprised of different signaling messages and the different signaling messages are transmitted to different signaling points.

In another embodiment, a plurality of the signaling points each reside in a different switch and are directly coupled to a processor in the switch that directs a switching matrix in the switch in response to signaling processed by the signaling point. The signaling processor is operational to direct the switching matrixes of multiple switches by signaling multiple signaling points. The signaling processor is also operational to signal multiple points in response to signaling from a single source, and to signal a point in response to signaling from multiple sources.

BRIEF DESCRIPTION OF THE DRAWINGS

These and other features, aspects, and advantages of the present invention will become better understood with regard to the following description, claims, and drawings where:

DESCRIPTION

Telecommunications systems establish communications paths between points which allow the points to transfer information, such as voice and data, over the communication paths. Typically, telecommunications systems are comprised of network elements and connections. A network element is a telecommunications device such as a switch, server, service control point, service data point, enhanced platform, intelligent peripheral, service node, adjunct processor, network element of a different network, enhanced system or other network related device, server, center or system.

A connection is the media between two network elements that allows the transfer of information. A few examples of connections are: digital T1 lines, OC-3 optical fibers, packet connections, dedicated access lines, microwave transmission, and cellular radio. As those skilled in the art are aware, connections can be described in a range from general to specific. All of the media between two switches is a general description and might correspond to a virtual path in an ATM system or a trunk groups in a T1 system. An individual circuit between two elements is more specific and might correspond to a virtual channel in an ATM system or a DS0 circuit in a T1 system. Connections can also be described as being logical or physical. Physical connections are electrical-mechanical media. Logical connections are paths which follow physical connections, but are differentiated from one another based on format and protocol. The term "connection" includes this entire range and the meaning varies according to the context in which the term is used. The present invention could make selections encompassing the entire range of connections.

A communications path is the combination of connections and network elements that physically transfers the information between points. A communication path may be point to point, point to multi-point, or multi-point to multi-point. These points, in turn, define the ends of the communications path. Thus, a connection may also be made between a network element and a point outside the network.

Signaling is the transfer of information among points and network elements and is used to establish communications paths. An example is Signaling System #7 (SS7). Signaling is typically transmitted over links, such as 56 kilobit lines. On the block diagrams, signaling is represented by dashed lines and connections are represented by solid lines.

Figure 1:
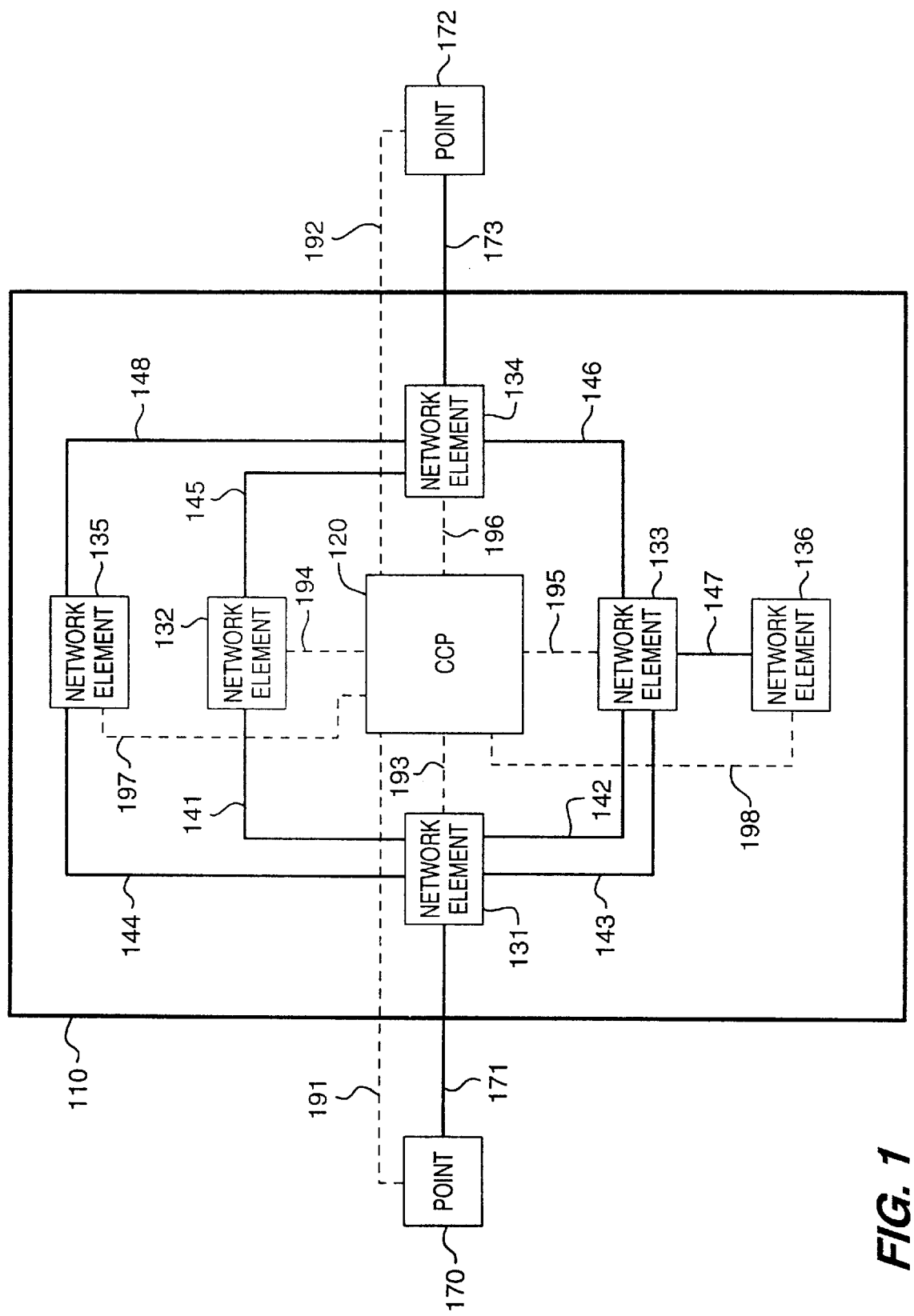
FIG. 1 is a block diagram of a version of the invention.

In FIG. 1, Telecommunications System 110 comprises a communication control processor (CCP) 120 and first, second, third, fourth, fifth and sixth network elements, 131, 132, 133, 134, 135 and 136 respectively. First and second network elements, 131 and 132 respectively, are connected by first connection 141. First and third network elements, 131 and 133 are connected by both second and third connections, 142 and 143 respectively. First and fifth network elements, 131 and 135 respectively, are connected by fourth connection 144. Second and fourth network elements, 132 and 134 are connected by fifth connection 145. The third network element 133 is connected to fourth and sixth network elements, 134 and 136 by sixth and seventh connections, 146 and 147 respectively. Fourth and fifth network elements, 134 and 135 are connected by connection 148. A first point 170, which is located outside of the system 110, is connected to first element 131 by first point connection 171, and a second point 172 which is also located outside the system 110 is connected to fourth element 134 by second point connection 173. First and second points, 170 and 172 respectively and first, second, third, fourth, fifth and sixth elements 131, 132, 133, 134, 135, and 136 respectively each are linked to CCP 120 by first, second, third, fourth, fifth, sixth, seventh, and eighth links, 191, 192, 193, 194, 195, 196, 197 and 198 respectively.

As those skilled in the art are aware, a system is typically comprised of many more network elements, links, connections and points, but the number is restricted for clarity. Points outside of the network can take many forms, such as customer premises equipment (CPE), telephones, computers, or switches of a separate network system. In addition the system 110, may take many forms such as international gateways, satellite networks, wireless networks, local exchange carriers (LECs), inter-exchange carriers (IXCs), transit networks, national networks, personal communicator systems (PCS), virtual private networks, or connection oriented networks such as local area networks (LANs), metropolitan area networks (MANs), wide area networks (WANs) to name some examples.

In operation Telecommunications System 110 is able to accept information from first point 170 and second point 172 and transmit the information over the various network elements and connections which form the communications path. System 110 is also capable of exchanging signaling with first point 170 and second point 172 over the first link 191 and second link 192.

On a standard call that establishes a communications path from first point 170 to second point 172, first point 170 will signal Telecommunications System 110 that it requests the communications path. This signaling is directed to CCP 120 over first link 191. CCP 120 processes the signaling and selects at least one network characteristic in response to the signaling. Network characteristics might be network elements, connections, network codes, applications, or control instructions to name a few examples. The selected network characteristic typically comprises one of a plurality of network elements and/or connections. The CCP 120 generates signaling which is preferably new signaling reflecting the selection. CCP 120 then transmits the signal to at least one of a plurality of network elements before that network element has applied the signal.

In one embodiment, CCP 120 selects the network elements and the connections that comprise the communications path. However, first point 170 will typically seize first point connection 171 contemporaneously with signaling. This initial connection could also be selected by CCP 120 from the available possibilities after the signaling by first point 170. Assuming first point 170 has seized first point connection 171 to first element 131, CCP 120 selects one, a plurality, or all of the remaining network elements and connections to further establish a communications path to second point 172.

CCP 120 determines which element should be connected to first element 131. CCP 120 could select either second element 132 or third element 133. If third element 133 is selected, CCP 120 may also select the connection to third element 133 from among second and third connections, 142 and 143 respectively. If third connection 143 is selected, CCP 120 will signal first element 131 over third link 193 to further the communications path to third element 133 over third connection 143.

CCP 120 may then make further selections to complete the communications path. As the possibilities have been limited for clarity, CCP 120 would make the selections and signal the elements as follows. CCP 120 would signal third element 133 over fifth link 195 to further the communications path to fourth element 134 over sixth connection 146. CCP 120 would signal fourth element 134 over sixth link 196 to further the communications path to second point 172 over second point connection 173. CCP 120 would also signal second point 172 over second link 192 of the communications path available through second point connection 173. In this way, the communications path requested by first point 170 is selected by CCP 120 and signaled to the elements. Throughout this process, CCP 120 may receive status messages and signaling from the elements to support its processing. This status massaging may be transmitted and received over links, connections, or other communication means.

In another embodiment, CCP 120 may select only the network elements and not the connections. The elements would select the connections to use based on the network element selected by CCP 120. For this embodiment, the main difference from the above example is that CCP 120 would instruct first element 131 to further the communications path to third element 133, but first element 131 would select the actual connection used from among second and third connections, 142 and 143, respectively. First element 131 may signal CCP 120 over third link 193 of its selection so that CCP 120 may signal third element 133 of the connection over fifth link 195. In this embodiment, CCP 120 would specify the network elements to the elements, which in turn, would select the connections between those network elements.

There are situations in which the selection of a network element and the selection of a connection signify the same thing. On FIG. 1 for example, instructing first element 131 to use first connection 141 is synonymous with an instruction to connect to second element 132. This is because the connection inevitably connects to the element. The selection of a connection may effectively select a network element, and the selection of a network element may effectively select a connection (or a group of specific connections) to that network element.

One skilled in the art will recognize that the selection process can be distributed among the CCP and the elements. The CCP might select all the network elements, a portion of the network elements, or none of the network elements leaving the switches to select the remainder. The CCP might select all of the connections, a portion of the connections, or none of the connections, again leaving the elements to select the remainder. The CCP may select combinations of the above options, but the CCP will always select at least one network characteristic.

In another embodiment, first point 170 may want to access a other network elements such as servers, platforms or operator centers. For example, such elements could be located at either fifth or sixth network elements 135, and 136 respectively. CCP 120 will receive signaling from first point 170 over first link 191 indicating this request, and first point 170 will typically seize first point connection 171 to first element 131. Again CCP 120 will select network elements. If sixth element 136 is selected, CCP 120 could select a communications path from first element 131 through either second element 132 to fourth element 134 and then to third element 133, or through a direct connection from first element 131 to third element 133. If CCP 120 selects the latter, it would signal first element 131 to further the communications path to third element 133, and it would signal third element 133 to further the communications path to sixth element 136. As discussed in the above embodiments, CCP 120 may also select the connections, or the elements may be left with that task.

As is known in the art, in-band signaling is typically used in many user to network connections, such as the local loop. This is because only one connection or link is typically provided to the user premises and thus, the signaling must be placed on the actual communications path. The initial network switch typically removes the signaling from the communications path and transfers it to an out-of-band signaling system. The current invention is fully operational in this context. Although the switch may receive the signaling initially, it will only route the signaling to the CCP for processing. Even if in-band signaling is used within the network, the switches could remove signaling from the communications path and route it to the CCP for processing in accord with the present invention.

Thus, preferably the CCP processes signaling before it is applied or processed by the switch such as to select connections or generate queries. Preferably, no or minimal changes are made to the signaling prior to the signaling being received by the CCP so that the CCP receives the signaling in the same format as a switch would receive the signaling. The CCP may also process the signaling in that format. The switches make their selections based on the CCP selections, thus the switch selections clearly occur after the CCP has processed the signaling. As such, the switch may route signaling to the CCP, but the switch does not apply the signaling. Some examples of a switch applying the signaling would be selecting network elements or generating queries for remote devices.

In one of the above embodiments, the switches did not select the network elements and connections, initiate the signaling, or otherwise control the communication. The switches only followed the instructions of the CCP and actually made the connections that furthered the communications path. In one embodiment, the switches were allowed to select the actual connections used, but even these selections were based on CCP selections.

As illustrated above, the CCP allows a telecommunications network to separate communication control from the communications path. In prior systems, the switches would select the network elements and the connections, as well as, actually providing a part of the actual connection. As a result, prior systems are restricted to the communication control capabilities provided by the switches. Prior systems have used remote devices, such as an SCP, to support switch control, but the remote device only answered queries in response to the switches processing of the signal. These remote devices do not process the signaling before the switch had already applied the signaling. By using the CCP, telecommunications systems can control communications independently of the capability of the switches to accomplish both tasks.

Figure 2:
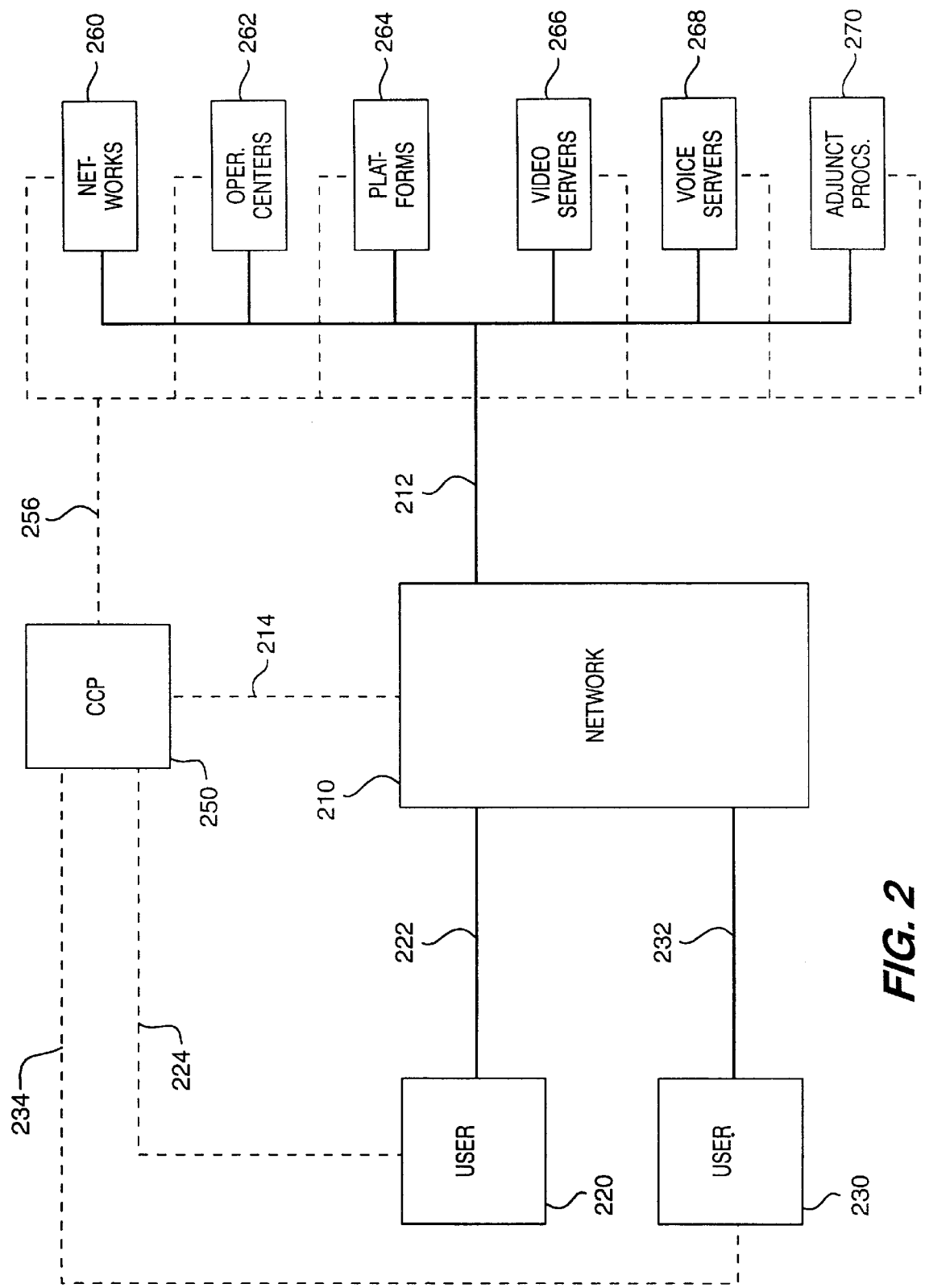
FIG. 2 is a block diagram of a version of the invention.

FIG. 2 shows a block diagram of another embodiment of the present invention. CCP 250 and network 210 are shown. CCP 250 is a communications control processor. CCP 250 could be integrated into network 210, but need not be and is shown separately for clarity. Network 210 could be any type of telecommunications network that operates using network elements, signaling, and connections. Examples would be LECs, IXCs, LANs, MANs, WANs, and Cellular Networks, but there are others. Additionally, network 210 could be narrowband, broadband, packet-based, or a hybrid. Network 210 is capable of providing communications paths between points both inside and outside of network 210. CCP 250 and network 210 are linked by link 214 and are able to signal each other in order to establish these paths.

Additionally, user 220 and user 230 are shown and are also capable of signaling. Examples of users 220 and 230 might be telephones, computers, or even switches in another telecommunications network. Users 220 and 230 are connected to network 210 by connections 222 and 232 respectively. Users 220 and 230 are linked to CCP 250 by links 224 and 234 respectively. Signaling may be transmitted over links 224 and 234. If in-band signaling is employed on connections 222 and 232, network 210 would separate at least a portion of the signaling out-of-band and transmit it to CCP 250 over link 214.

Also shown are various network elements. As with CCP 250, these elements could also be integrated into network 210, but are shown separately for clarity. These network elements are: networks 260, operator centers 262, enhanced platforms 264, video servers 266, voice servers 268, and adjunct processors 270. This is not an exclusive list. Those skilled in the art will recognize these network elements and their functions, as well as the many other types of telecommunications devices, such as billing servers, that are applicable in this situation.

Each network element is connected to network 210 by connection 212. Connection 212 represents several actual connections between the network elements (260–270) and different elements in network 210. One bus-type connection is shown for purposes of clarity, but those skilled in the art are familiar with many actual types of connections to use. Additionally link 256 is shown from CCP 250 to the network elements (260–270). Link 256 is similarly represented as a bus-type link for clarity, and multiple links are actually used, although some network elements may not even require links. Link 214 has been simplified for clarity in the same fashion.

In one embodiment, user 220 may desire to establish a communications path to user 230. CCP 250 would make the appropriate selections and signal the network elements in network 210 as discussed with regard to the embodiments of FIG. 1. As a result, a communications path would be established from user 220 to user 230 through network 210 and connections 222 and 232.

In another embodiment, user 220 may desire to access one of the various network elements (260–270). User 220 will typically seize connection 222 to network 210 and generate signaling. Both in-band signaling on connection 222 and out-of-band signaling on link 224 would be directed to CCP 250. By processing the signaling, CCP 250 can select any of the network elements (260–270) and control the communications through network 210 and connection 212 to the network elements (260–270).

For example, should user 220 desire to connect to a video server and another network, user 220 would signal the request. The signaling would be directed to CCP 250 over link 224, or over connection 222 and link 214 as discussed above. CCP 250 would process the signaling and make the appropriate selections. CCP 250 would signal network 210 and video servers 266 of its selections. As a result, a communications path would be set-up from user 220 to video servers 266.

Additionally, CCP 250 would control communications to the other network which is represented by networks 260. Networks 260 could be any other form of telecommunications network—either public or private. CCP 250 would make the appropriate selections to further the communications path over connection 212 and network 210 to networks 260. Upon signaling from CCP 250, the connections comprising the communications path would be made. Networks 260 would also be signalled by CCP 250 over link 256. As such a communication path is set up from user 230 to video servers 266 and on to networks 260.

There may also be several devices represented by particular network element shown on FIG. 2. CCP 250 could also select the particular device to access. For example, take the situation in which voice servers 268 represents 20 individual voice server devices split among three different locations. On each call, CCP 250 could select the actual voice server device which should be used on that call and control the communications through network 210 and connection 212 to the selected device. Alternatively, CCP 250 may only be required to select group of devices, for instance at a particular location, instead of the actual device.

Figure 3:
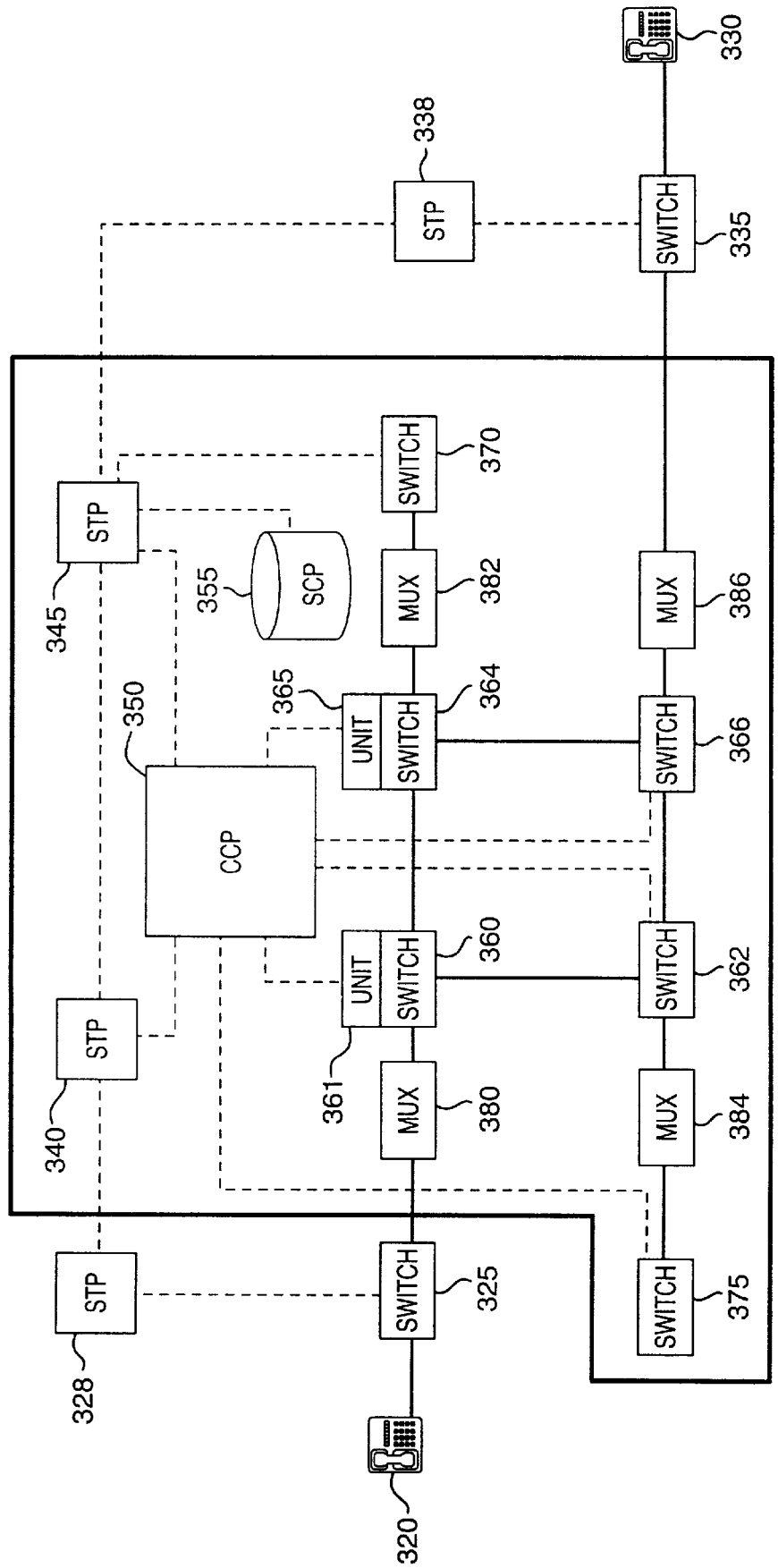
FIG. 3 is a block diagram of a version of the invention.

As is known, large telecommunication networks are comprised of numerous network elements, connections, and links. The present invention is suitable for use in this context. FIG. 3 shows a version of the present invention in the context of a large network. Typically, this network would be comprised of several broadband switches, narrowband switches, muxes, signal transfer points (STPs), Service Control Points (SCPs), operator centers, video servers, voice servers, adjunct processors, enhanced services platforms, connections, and links. For purposes of clarity, only a few of these possibilities are shown on FIG. 3. For the same reason, connections and links are not numbered.

FIG. 3 shows Telecommunications Network 310 which is comprised of STP 340, STP 345, CCP 350, SCP 355, broadband switches 360, 362, 364, and 366, interworking units 361 and 365, narrowband switches 370 and 375, and muxes 380, 382, 384, and 386. Aside from CCP 350, these elements of a large network are familiar to one skilled in the art and examples of the of these network elements are as follows: STP—DSC Communications Megahub; SCP—Tandem CLX; broadband switch—Fore Systems ASX-100; narrowband switch—Northern Telecom DMS-250; and mux—Digital Link Premis Way with CBR module.

In at least one embodiment, the broadband switches are equipped with signaling interworking units. These units translate SS7 messages into B-ISDN messages. In that event, the CCP could transmit SS7 to the broadband switches which could convert the signals properly. Interworking is discussed in ITU-TS Recommendation Q.2660, "B-ISDN, B-ISUP to N-ISUP Interworking".

When user information passes from a broadband network to a narrowband network, it typically must pass through a mux. Muxes can convert transmitted information back and forth between narrowband and broadband formats. In at least one embodiment, each broadband connection on one side of a mux corresponds to a narrowband connection on the other side of the mux. In this way, the CCP can track connections through the mux. If the communication path is on a given narrowband connection entering the mux, it will exit the mux on its corresponding broadband connection. This correspondence allows the CCP to identify connections on each side of the mux based on the entry connection. Muxes are typically placed at any interface between narrowband and broadband connections.

As long as the connections correspond through the mux, the CCP can track the communication path properly. Alternatively, the connections may not correspond. In that case, signaling links between the muxes and the CCP would be required for the devices to communicate and allow the CCP to track the communication path.

Additionally, Telecommunications Network 310 includes the connections and links which are not numbered. These connections and links are familiar to those skilled in the art. Some examples of possible connections are switched digital lines, satellite links, microwave links, cellular links, and dedicated digital lines, but there are others. The signaling links are typically data links, such as 56 kilobit lines. The signaling may employ SS7, Broadband, C6, C7, CCIS, Q.933, Q.931, T1.607, Q.2931, B-ISUP or other forms of signaling technology. The present invention is fully operational with the many variations which are well known in the art. Additionally, it is also known that a direct link between two devices can be used instead of an STP for signal routing.

Outside of Telecommunications Network 310 are first point 320, second point 330, LEC switch 325, LEC switch 335, LEC STP 328, and LEC STP 338. These devices are shown along with their links and connections. First point 320 is connected to LEC switch 325. LEC switch 325 is linked to LEC STP 328 which routes signaling from LEC switch 325. LEC switch 325 is also connected to mux 380 of Telecommunications Network 310. LEC STP 228 is linked to STP 340 of Telecommunications Network 310.

STP 340 is linked to STP 345. The other links are as follows. STPs 340 and 345 are linked to CCP 350. CCP 350 is linked to interworking units 361 and 365 of broadband switches 360 and 364 respectively. CCP 350 is linked to broadband switches 362 and 366, and narrowband switch 375. STP 345 is linked to narrowband switch 370 and SCP 355. STP 345 is also linked to LEC STP 338 which is linked to LEC switch 335.

Mux 380 is connected to broadband switch 360. Broadband switch 360 is connected to broadband switches 362 and 364. Broadband switch 362 is connected to mux 384 which is connected to narrowband switch 375. Broadband switch 364 is connected to mux 382 which is connected to narrowband switch 370. Broadband switches 362 and 364 are both connected to broadband switch 366. Broadband switch 366 is connected to mux 386 which is connected to LEC switch 335. LEC switch 335 is connected to second point 330.

When a call is placed from first point 320 that requires the use of Telecommunications Network 310, LEC switch 325 will typically seize a connection to Telecommunications Network 310 and generate a signal containing call information. At present, this signal is in SS7 format and the seized connection is a DS0 port. The signal is transmitted to LEC STP 328 which transfers it on to STP 340. LEC switch 325 also extends the communication path over the seized connection. These LEC components and the process of establishing communication paths between a point, a LEC, and an IXC are familiar to those skilled in the art.

Telecommunications Network 310 accepts the communication path on the narrowband side of mux 380. The present invention can also accept broadband calls that do not require a mux, but typically, calls from a LEC will be narrowband. Mux 380 converts the call to broadband and places it on the broadband connection that corresponds to the seized connection. The communication path extends to broadband switch 360 through mux 380.

STP 340 transfers the signal from LEC STP 328 to STP 345 which, in turn, routes the signal to CCP 350. Also, CCP 350 accepts status messages from the broadband and narrowband switches over standard communications lines, and may query SCP 355 for information. Any suitable database or processor could be used to support CCP 350 queries. CCP 350 uses this information and its own programmed instructions to make communication control selections. For calls that require narrowband switch treatment, CCP 350 will select the narrowband switch.

Preferably, CCP 350 can select any narrowband switch in Telecommunications Network 310. For example, it may extend the communication path through the broadband network to a narrowband switch across the network for processing, or it may extend the communication path to a narrowband switch connected to the broadband switch that originally accepts the communication path. Additionally, no narrowband switch may be required at all. For clarity, all of the switches representing these possibilities are not shown on FIG. 3.

CCP 350 will select at least one network characteristic in response to the signaling. Typically, this will be the network elements or connections that will make the communication path. As discussed with regard to the above embodiments, CCP 350 may select only the network elements and allow the switches to select the connections, or the selections can be distributed among the two. For example, CCP 350 may only select some of the network elements and connections and allow the switches to select some of the network elements and connections. CCP 350 might only select the narrowband switches and allow the broadband switches to select the broadband switches that will make the communication path. CCP 350 can also select other network characteristics, such as applications and control instructions.

In one embodiment, CCP 350 will select the narrowband switches to process particular calls and the DS0 ports on those switches which will accept these calls. The broadband switches will select the broadband switches and the broadband connections to the DS0 port. Restricted to the possibilities depicted on FIG. 3, CCP 350 may select either narrowband switch 370 or narrowband switch 375 to process the call. Assuming CCP 350 selects narrowband switch 370, it would also select a DS0 port on narrowband switch 370 to accept the connection. CCP 350 would then signal broadband switch 360 through interworking unit 361 to further the communications path to the selected DS0 port on narrowband switch 370.

Of the possible routes, broadband switch 360 would be left to select the other broadband switches and connections to use. Assuming the route directly to broadband switch 364 is selected, broadband switch 360 would farther the communications path to that switch. Broadband switch 360 would also signal broadband switch 364 of the communication path. Broadband switch 364 would further the communication path to through mux 382 to access the specified DS0 port on narrowband switch 370. This is accomplished by corresponding the connections through the mux as discussed above. CCP 350 will signal narrowband switch 370 of the incoming communication path. This signal is routed by STP 345. Narrowband switch 370 will process the call on the specified DS0 port. Typically, this would include billing and routing the call. Narrowband switch 370 may also query SCP 355 to aid in application of services to the call. For example, narrowband switch 370 may retrieve an "800" translation from SCP 355. As a result of the processing, narrowband switch 370 will switch the call and generate a new signal which may include routing information. The signal is sent to CCP 350 through STP 345. The communication path is furthered on a new connection back to broadband switch 364 through mux 382. CCP 350 may use the information in the signal, SCP information, network element information, operational instructions, and/or its own routing logic to make new selections for the call. The network element information and operational instructions could be signalled to CCP 350 or delivered over standard data lines.

In one embodiment, the selection of a network characteristic will include the selection of a network code. Network codes are the logical addresses of network elements. One such code is a destination code that facilitates egress from Telecommunications System 310. The destination code typically represents a network element that is connected to a LEC switch. Once a destination is selected, CCP 350 will signal broadband switch 364 of its selections and the communication path will be furthered through the broadband network accordingly. In the current example this could be through broadband switch 366 and mux 386. The communication path would be furthered to the specified port on LEC switch 335. Typically, this involves the seizure of a connection on the LEC switch by the IXC.

In one embodiment, whenever broadband switch 366 extends a communication path to mux 386, it is programmed to signal CCP 350 of the broadband connection it has selected. This allows CCP 350 to track the specific DS0 port on the LEC switch that has been seized. CCP 350 would signal LEC switch 335 through STP 345 and LEC STP 338 of the incoming call on the seized DS0 connection. As a result, LEC switch 335 would further the communication path to second point 330.

It can be seen from the above disclosure that the present invention allows a telecommunications network to employ a broadband network to make call connections. By using muxes to convert calls and a CCP to analyze signaling, this broadband network remains transparent to the networks of other companies. An example of such a transparent interface is between an interexchange carrier (IXC) network and a local exchange carrier (LEC) network. Similarly the network will be transparent if deployed in only a portion of a single company's network infrastructure.

In the above embodiment, the LEC seizes an IXC DS0 port and signals to an IXC STP. The mux and the CCP convert the call and analyze the signal appropriately. No changes in other existing carrier systems, such as LEC systems, are required.

Additionally the narrowband switch receives the call and signal in its own format and switches the call. Although the switch may "think" the call is routed over a trunk to another narrowband switch, the call actually goes right back to the mux and broadband switch that sent the call. The narrowband switch is used to apply features to the call, i.e. billing, routing, etc. The broadband network is used to make the substantial portion of the call connection. The CCP may use narrowband switch call processing information to make selections.

The CCP performs many functions. In one embodiment, it accepts signaling from a first point or LEC and provides appropriate signals in accord with the communication control selections it has made. These selections are network characteristics. The CCP may select network elements such as switches, servers, or network codes. The CCP may select connections, such as DS0 circuits and ports. The CCP may select particular telecommunications applications to be applied to the communications path. The CCP may select particular control instructions for particular devices. The CCP may also receive information from entities such as SCPs, operational control, or switches to aid in its selections.

The CCP is a processing system, and as such, those skilled in the art are aware that such systems can be housed in a single device or distributed among several devices. Additionally, multiple devices with overlapping capabilities might be desired for purposes of redundancy. The present invention encompasses these variations. One such operational system would be multiple pairs of CCPs located regionally within a telecommunications system. Each machine would be equally capable of communication control. One example of a CCP device would be a Tandem CLX machine configured in accord with this disclosure of the present invention.

A signaling point handles the signaling for a switch. Switches which are used to route calls typically have a signaling point which is directly coupled to a processor in the switch. This processor controls a switching matrix in the switch in response to the signaling processed by the signaling point. Thus, there is typically a one to one correspondence of a signaling point for each switch and matrix.

The CCP is not directly coupled to one switch, one switch processor (CPU), or one switching matrix. In contrast, the CCP has the capability of directing a plurality of switches. Thus, the CCP can direct multiple switch matrixes by signaling multiple signaling points.

It is possible to house the CCP within other telecommunication devices, even switches. Although the CCP can be primarily distinguished from a switch CPU based on physical location, this does not have to be the case. A switch CPU receives information from a signaling point and controls the matrix of a single switch. Some switches distribute the matrix among different physical locations, but the CPU controls each matrix based on information received from a single signaling point. This information is not signaling.

In contrast, the CCP receives signaling and has the ability to signal other network elements. It can communicate with multiple signaling points. These signaling points provide information to the switch CPUs which control the switch matrixes. By signaling multiple signaling points, the CCP is able to direct the matrixes of multiple switches based on the signaling and other information the CCP obtains. A CCP is not associated with a single switch matrix. A CCP does not require communication path connections in order to operate.

Figure 4:
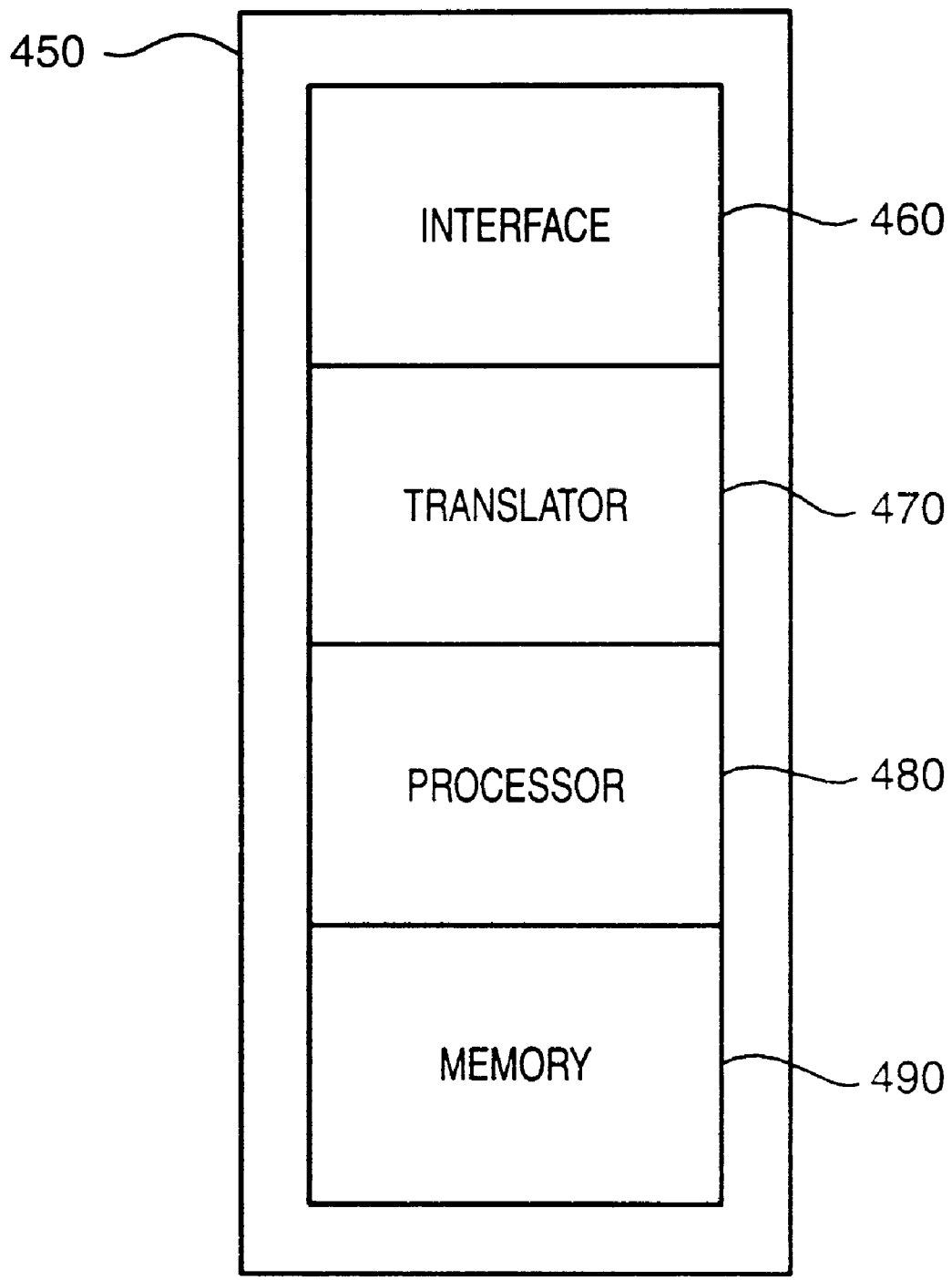
FIG. 4 is a logic diagram of a version of the invention.

The main capabilities of one version of a CCP are shown on FIG. 4. CCP 450 comprises interface 460, translator 470 operably connected to interface 460, processor 480 operably connected to translator 470, and memory 490 operably connected to processor 480.

CCP 450 functions to physically connect incoming links from other devices such as STPs, switches, SCPs, and operational control systems. Interface 460 is functional to accept the signals off of these links and transfer the signals to translator 470. Interface 460 is also be able to transfer signaling from translator 470 to the links for transmission.

Translator 470 accepts the signaling from interface 460 and identifies the information in the signaling. Often, this will be done by identifying a known field within a given signaling message. For example, translator 470 might identify the Origination Point Code (OPC), Destination Point Code (DPC), and Circuit Identification Code (CIC) in an SS7 message. Additionally, translator 470 must be able to formulate outgoing signaling and transmit it to interface 460 for transmission. For example, translator 470 might replace the OPC, DPC, and CIC in a given SS7 message and transfer the modified SS7 message to interface 460 for transmission. Translator 510 must be equipped to manage the signaling formats it will encounter. Examples are SS7 and C7.

Processor 480 accepts the signaling information from translator 470 and makes the selections that accomplish communication control. This includes the selection of the network elements and/or connections that make the communications path. Typically, selections are made through table look-ups and SCP queries. Tables are entered and queries are generated based in part on the information identified by translator 470. The table look-ups and SCP information retrieval yield new signaling information. The new information is transferred to translator 470 for formulation into appropriate signals for transmission. Algorithm solution could also be used to make selections. Processor 480 also handles various status messages and alarms from the switches and other network elements. Operational control can also be accepted. This information can be used to modify the look-up tables or selection algorithms. Memory 490 is used by processor 480 to store programming, information, and tables.

Figure 5:
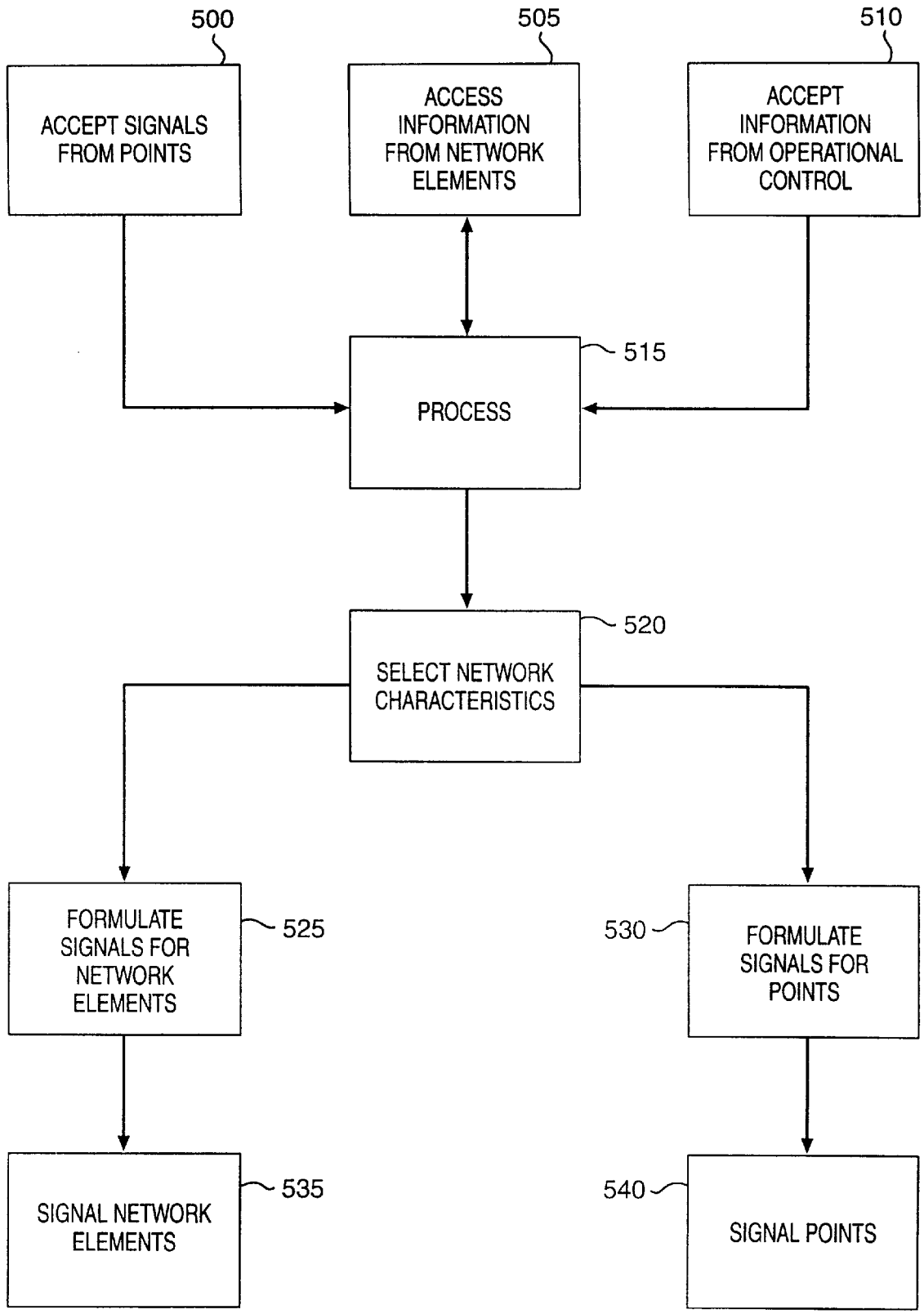
FIG. 5 is a flow diagram of a version of the invention.

FIG. 5 shows a flow diagram for the CCP for a version of the present invention. The sequence begins with the CCP receiving different types of information. Box 500 depicts the CCP accepting a signal from a first point. This signal could be in any format, such as SS7 or broadband signaling. The signal may have passed through STPs from a LEC over a signaling link, or it may also be a signal directly provided by an individual user of a network. The signal contains information about the requested communication path. An example of such information is the message type which indicates the purpose of the message. Another example of such information is set-up information such as transit network service value, bearer capability, nature of address, calling party category, address presentation restriction status, carrier selection value, charge number, and originating line information, and service code value. Other information might be a network indicator or a service indicator. Those skilled in the art are familiar with these types of information.

Other types of information might also be accessed by the CCP. The network elements, such as switches, may provide the CCP with information as shown in box 505. This information allows the CCP to select network elements and connections based on network conditions. Examples of possible types of such information could be management messages, loading, error conditions, alarms, or idle circuits. The CCP might also provide the network elements with information.

Box 510 shows that operational control might be provided. Operational control allows system personnel to program the CCP. An example of such control might be to implement a management decision to retire a particular network element. Operational control would allow the removal that element from the selection process.

The CCP processes the information is has received in box 515. Processing also entails the use of programmed instructions in the CCP, and might even include the use of information retrieved from a remote database, such as an SCP. The selections are then made as shown in box 520. These selections specify network characteristics, such as network elements and/or connections. As stated above, The CCP may only select a portion of the network characteristics and allow the points or the switches to select the remainder. It should be pointed out that the information used in processing is not limited to that which is listed, and those skilled in the art will recognize other useful information which may be sent to the CCP.

Once network characteristics are selected, the CCP will signal the points and the applicable network elements of the selections. In box 525, signals are formulated instructing the network elements of the network characteristics selected. The signals are transmitted to the appropriate network elements in box 535 which will typically result in a communication path through the network elements and connections. Other activity, such as applications and control procedures might be implemented as well. Additionally, in boxes 530 and 540, signals are formulated and sent to the points. Typically the new signals generated by the CCP are sent to network elements or multiple signaling points. These new signals could be the same, however different signaling is typically sent to the different network elements which may used as part of a communication path.

Figure 6:
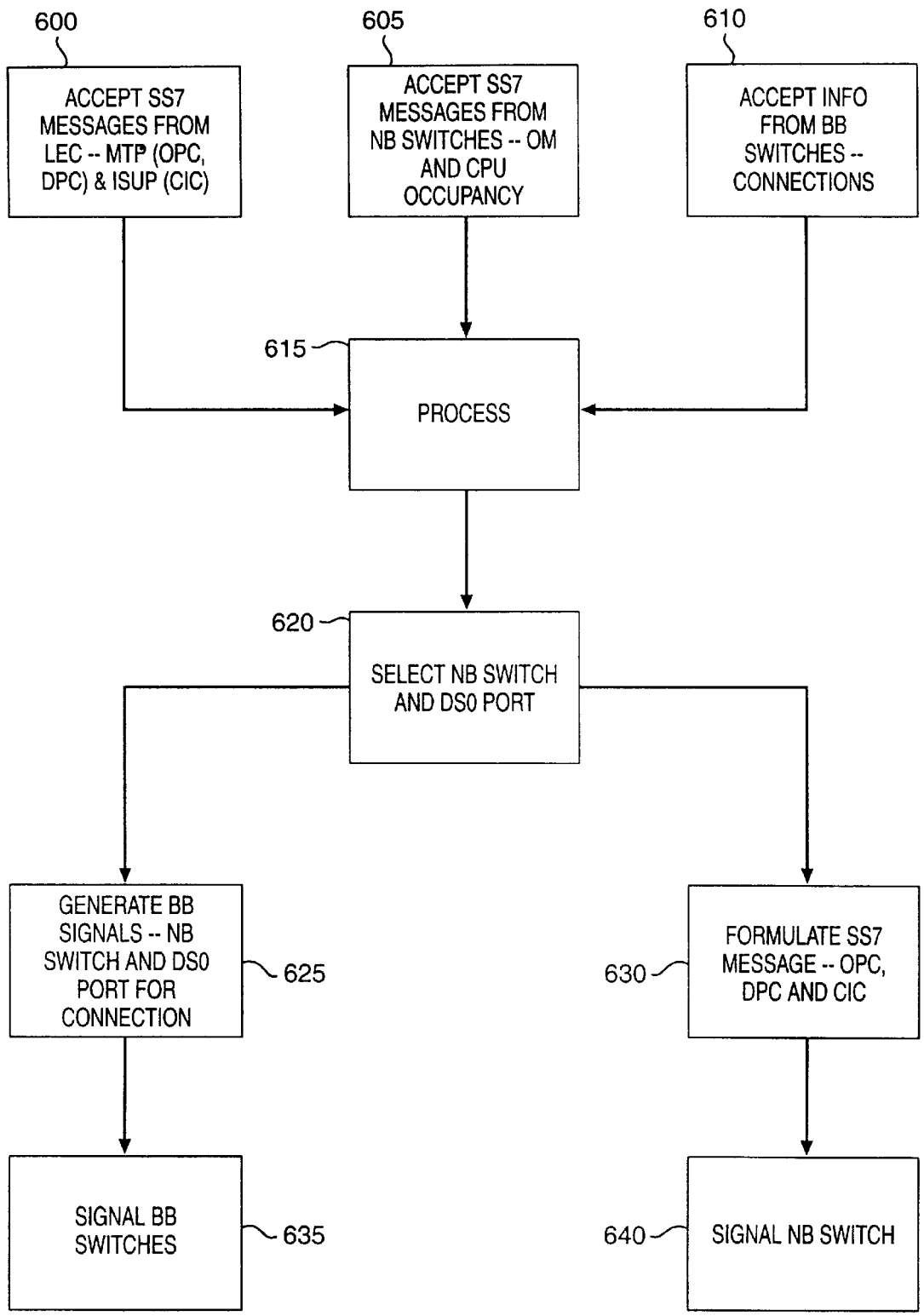
FIG. 6 is a flow diagram of a version of the invention.
Figure 7:
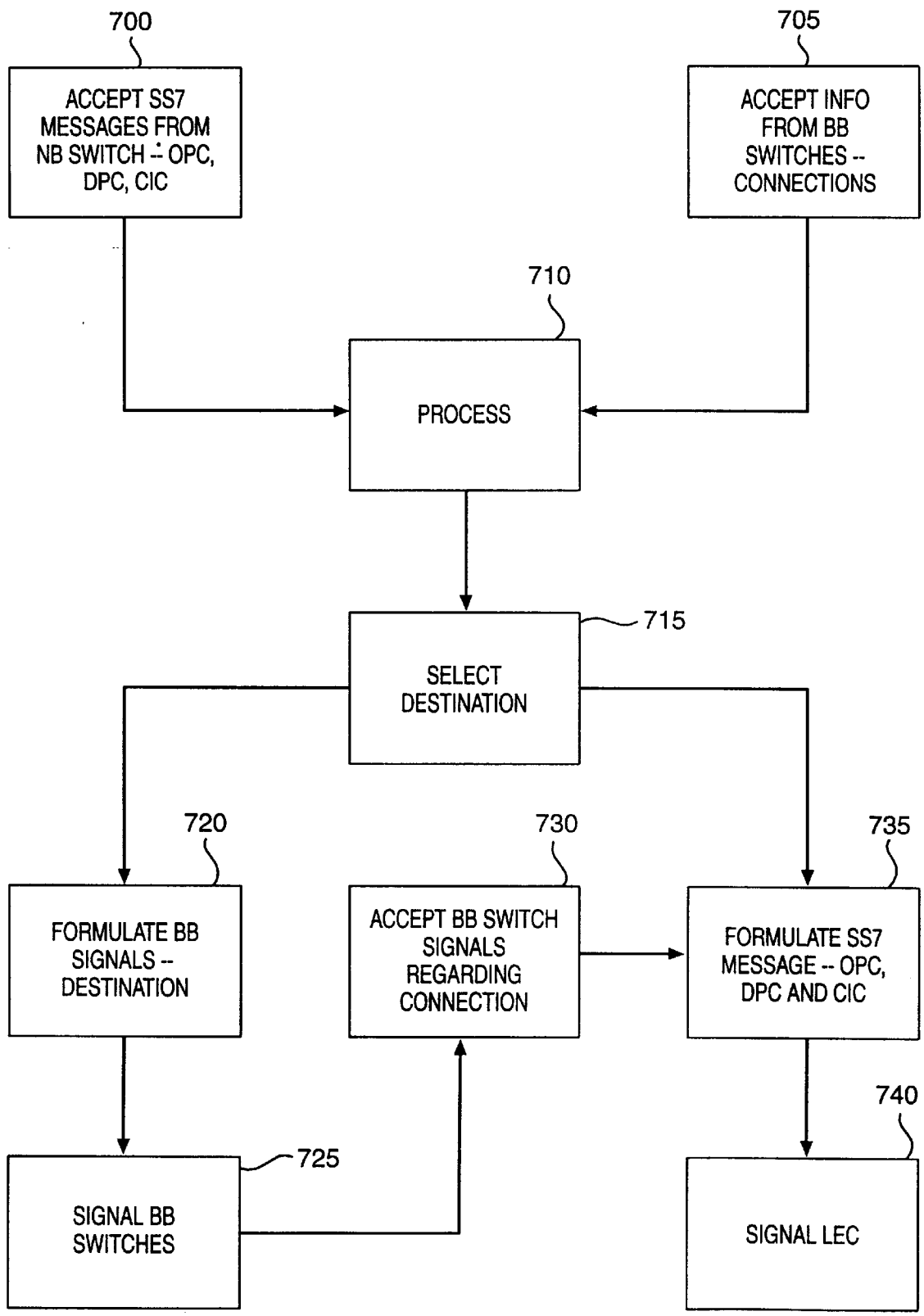
FIG. 7 is a flow diagram of a version of the invention.

FIG. 5 represents the sequence that the CCP performs in one embodiment to control communications and establish a communication path from a first point to a second point through network elements and connections. FIGS. 6 and 7 represent a similar sequence, and they are in the context of an Interexchange Carrier (IXC) similar to that depicted in FIG. 3. The IXC accepts DS0 connections and SS7 signaling from a LEC and employs a broadband system to make the substantial portion of the communication path.

FIG. 6 depicts the flow of the CCP in a version of the present invention when a communication path is established from the LEC to a narrowband switch in the IXC. Box 600 shows that an SS7 message is accepted from the LEC which contains a Message Transfer Part (MTP) and an Integrated Service User Part (ISUP). As those skilled in the art are aware, the MTP contains the Originating Point Code (OPC) and the Destination Point Code (DPC). These point codes define specific signaling points in the network and are typically associated with a switch. As such, the OPC and DPC define a portion of the desired communication path.

When the communication path is extended into the IXC network, the OPC designates the LEC switch that connected to the IXC (#325 on FIG. 3). Previously, the DPC has designated the narrowband switch that the LEC would connect to for calls into the IXC. In this embodiment of the present invention, the DPC may designate a particular narrowband switch from the LEC's perspective, but the CCP actually selects the actual narrowband switch used. A mux or a broadband switch accepts the connection from the LEC, not a narrowband switch.

The ISUP contains the Circuit Identification Code (CIC) which designates the DS0 port that the LEC has seized. Previously, this DS0 Port was on a narrowband switch, but in this embodiment of the present invention, the DS0 port is actually on a mux.

Box 605 shows that the CCP may receive status information from the narrowband switches. These messages include Operational Measurements (OM) and CPU Occupancy information. OM includes trunk usage status of the switches which tells the CCP which DS0 ports are available on the narrowband switches. CPU Occupancy tells the CCP of the specific switching load of each narrowband switch. Box 610 shows that the CCP may also accept status information from the broadband switches indicating which connections are idle. This information allows the CCP to specify and balance routing through the broadband switches if desired. As discussed in relation to some of the other embodiments, the broadband switches may be left with that selection.

The CCP processes the information it has received in box 615. Those skilled in the art are aware of other information which would be useful in this context. As a result of the processing, a narrowband switch and a DS0 port on that switch are typically selected as shown in box 620. The selected narrowband switch may be close to the LEC or across the broadband network. The CCP determines which narrowband switch will process the call. This makes the narrowband switches virtually interchangeable.

Box 625 shows that a signal indicating these selections is generated and sent to the appropriate broadband switches in box 635. As discussed, the broadband switches may employ interworking units to handle signaling. Typically, the broadband switches will use internal tables to select broadband connections based on information in the signal from the CCP. Such information might identify the existing extent of the communication path and specify the narrowband switch and the DS0 port on that switch to which the communication path should be extended. The tables would be entered with this information and yield a particular broadband connection to use. Broadband switches further along the communications path could also receive similar signals from the CCP and use similar tables. Alternatively, the broadband switches further along the communications path might only need to enter an internal table using the incoming broadband connection and yield a new broadband connection on which to extend the communications path.

Those skilled in the art are familiar with broadband systems which can accomplish this. Broadband signaling is discussed in the following ITU-TS Recommendations: Q.2762"B-ISDN, B-ISDN User Part—General Functions of Messages"; Q.2763"B-ISDN, B-ISDN User Part—Formats and Codes"; Q.2764"B-ISDN, B-ISDN User Part—Basic Call Procedures"; Q.2730"B-ISDN, B-ISDN User Part— Supplementary Services"; Q.2750"B-ISDN, B-ISDN User Part to DSS2 Interworking Procedures"; and Q.2610"Usage of Cause and Location in B-ISDN User Part and DSS2".

In at least one embodiment, the broadband switches are equipped with signaling interworking units. These units translate SS7 messages into B-ISDN messages. In that event, the CCP could transmit SS7 to the broadband switches which could convert the signals properly. Interworking is discussed in ITU-TS Recommendation Q.2660, "B-ISDN, B-ISUP to N-ISUP Interworking".

In one embodiment, the broadband switches may select the actual virtual connection that corresponds through a mux to a DS0 port. This DS0 port could be on a narrowband switch or a on a point, such as a LEC switch. In this case, the CCP would not need to select a DS0 port since the broadband switch was in effect doing so. The internal tables of the broadband switches would be programmed to trigger when the particular broadband switch was connecting to particular broadband connections. These connections might be to a DS0 port on a narrowband switch or any specified point. Upon the trigger, the broadband switch would signal the CCP of the broadband connection it has used. The CCP would incorporate this information into the signal it sends to the narrowband switch or specified point. It is preferred that the CCP select the DS0 port on the selected narrowband switches, and that the broadband switches be allowed to select the broadband connection out of the network (through a mux) and signal the CCP of its selection.

The SS7 message from the LEC informed the CCP which DS0 port had been seized (the CIC), on which IXC device (DPC), and by which LEC switch (the OPC). By tracking the DS0 Port through the mux (#380 on FIG. 3), the CCP knows which connection the communication path will use to get to the broadband switch (#360 on FIG. 3). The CCP provides the broadband network with the proper signaling to extend the communication path from this switch to the selected narrowband switch as shown in box 635.

Box 630 shows that the CCP formulates an SS7 message based on the selections relating to the narrowband switch. SS7 message formulation methods, such as drop and insert, are known in the art. A new DPC is inserted that will designate the narrowband switch selected by the CCP. A new CIC is inserted that will designate the DS0 port on that switch as selected by the CCP. The SS7 message is sent to the narrowband switch in box 640.

As such, the communication path is extended from the LEC through the broadband network to the narrowband switch, and the narrowband switch is notified of the incoming communication path. Another portion of the SS7 message contains call information including ANI and DNIS. This information was supplied by the LEC and is in the SS7 message sent to the narrowband switch.

The narrowband switch uses this information along with its own programming to switch the call. This switching may include various switching programs and remote databases. The narrowband switch will select a new DPC based on this processing. It will switch the call to a new DS0 port. Previously, this port was connected to a trunk connected to the next narrowband switch in the call routing scenario. However, in the present invention, the DS0 port is connected through a mux to broadband switch. The narrowband switch will place the new DPC in an SS7 message. Along with the new DPC, a new CIC identifying the new DS0 circuit, and a new OPC designating the narrowband switch itself is placed in the SS7 message and sent to the CCP.

FIG. 7 shows the flow of the CCP when extending a communication path from the selected narrowband switch to a point outside of the IXC in one embodiment of the present invention. The SS7 message generated by the narrowband switch after processing the call is received by the CCP in box 700. In it, the CIC designates the DS0 port the communications path extends from on the narrowband switch. Because this port is connected to a mux with corresponding connections, the CCP can determine which connection the communication path uses to extend back to the broadband switch.

The CCP may also receive status information from the broadband switches as shown in box 705. This information allows the CCP to select broadband connections if desired. As discussed, the broadband switches may make these selections. Typically, the broadband switches will use internal tables to select broadband connections based on information in the signal from the CCP. Such information might specify destination code. The destination code might correspond to a terminating switch or a LEC switch to which the communication path should be extended.

As shown in box 710, the CCP applies processing and selects the appropriate destination for the broadband network to extend the communication path to as shown in box 715. The CCP may use the new DPC provided by the narrowband switch to identify the destination for the broadband communication path.

In box 720, signals are generated reflecting this selection and sent to the appropriate broadband switches in box 725. As discussed, the broadband switch may trigger and signal the CCP when it uses particular connections. This would occur for a connection through a mux to a LEC switch. This signal is accepted by the CCP in box 730 and is used to identify the DS0 port. An SS7 message is formulated in box 735 and in it the CIC will identify this DS0 connection on the LEC switch (#335 on FIG. 3). Alternatively, this DS0 port may have been selected by the CCP and signalled to the broadband switch. The LEC is signalled in box 740.

From FIGS. 6 and 7, a sequence is shown that demonstrates the procedures that the CCP can follow to accept signaling from the LEC and make selections that control communications through the IXC network. The CCP must produce signals to implement its selections and transmit them to the applicable network elements. The CCP is able to use the routing, billing, and service features of a narrowband switch, but is still is able to employ a broadband network to make a substantial part of the communications path.

Figure 8:
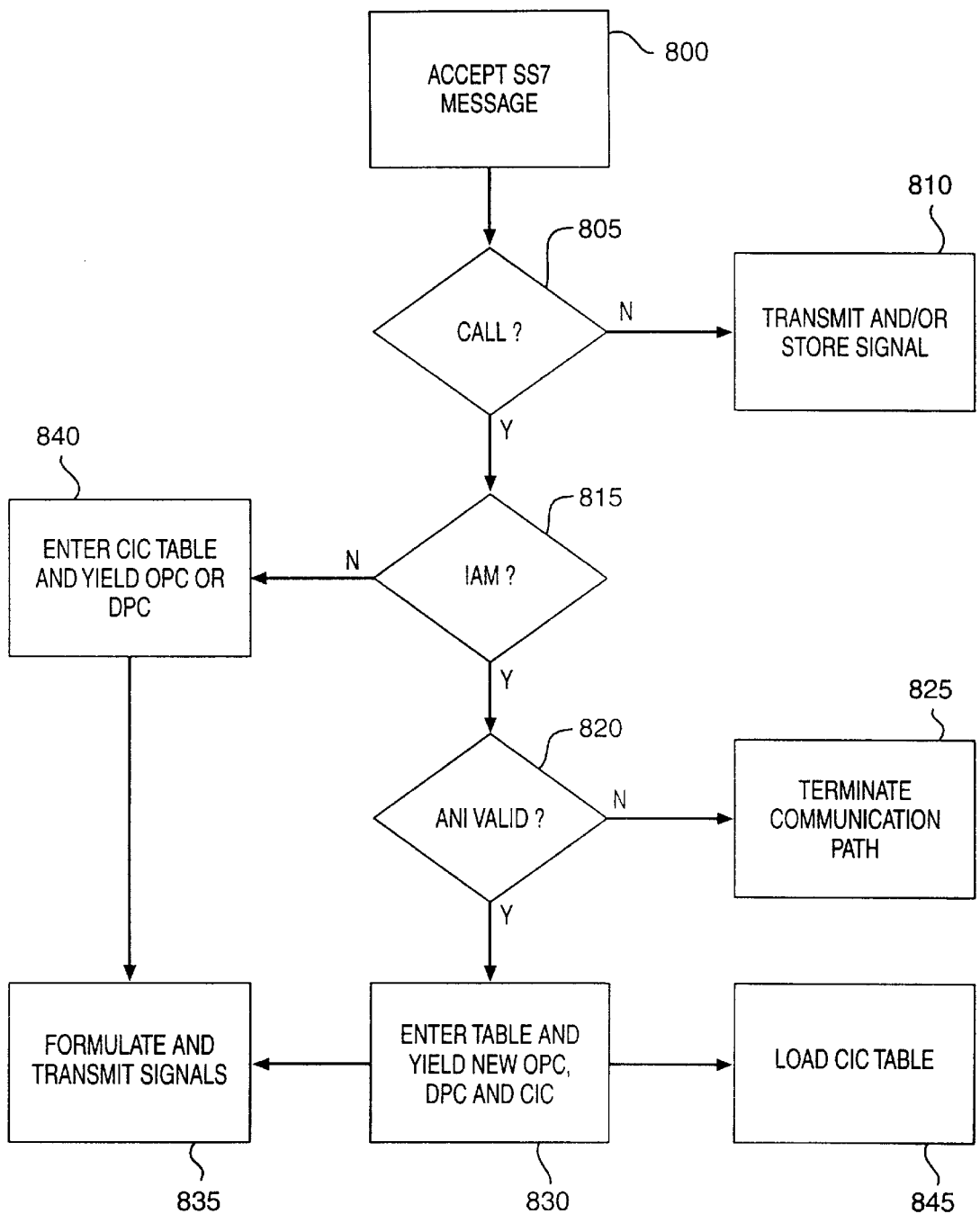
FIG. 8 is a flow diagram of a version of the invention.

FIG. 8 is a flow diagram of CCP signal processing in one embodiment of the invention. Box 800 shows that an SS7 signal has been accepted by the CCP. Box 805 shows that the CCP determines the message type. If the message is not a call message, it is routed or used to update the CCP memory if appropriate as shown in box 810. Non-call messages are familiar to those skilled in the art with examples being filler or management messages. If the SS7 message is a call message, it is examined to determine if it is an initial address message (IAM) in box 815. Call messages and IAMs are familiar to those skilled in the art. If it is an IAM, the information provided by automatic number identification (ANI) is used to validate the call in box 820. ANI validation is accomplished with a table look-up and is well known. If invalid, the communication path is terminated as shown in box 825.

Once an IAM with a valid ANI is determined, a table is entered which yields an OPC—DPC—CIC combination as shown in box 830. One skilled in the art will recognize that such a table can take many forms. One example is to set up a table with every combination of OPC—DPC—CIC on one side. The table is entered using the OPC—DPC—CIC of the incoming IAM message. After entry through these fields is accomplished, the table yields a new OPC—DPC—CIC which can be formulated into the SS7 message and sent to the switching network as shown in box 835. The switching network is capable of using this information to make connections.

Once the IAM signal has been processed, subsequent SS7 massaging can be processed by a separate CIC look-up table entered using the CIC as shown in box 840. Subsequent messages, such as address complete, answer, release, and release complete can be processed by entering the CIC table using the CIC in these non-lAM signals. For signals directed to the first point, the table yields the original OPC which is used as the DPC. Additionally, subsequent messages from the first point enter the CIC table using their CIC, and the table yields the DPC previously selected by the CCP for the IAM processing. The CIC table is constantly updated to reflect current processing as shown in box 845. In this way, the CCP is able to efficiently process non-IAMs because theses signals only need to reflect the results of previous IAM selections.

There can be exceptions to the use of the CIC table for non-IAM call messages. One example would be if a new connection is allowed after release. In that case, the IAM procedures would be followed.

Those skilled in the art will recognize the numerous factors that can be used to design and load the tables. Different OPC—DPC—CIC combinations can be yielded by the tables based on many factors. Some of these factors are: called number, time of day, CPU occupancy, switch status, trunk status, automatic call distribution, operational control, error conditions, network alarms, user requests, and network element status.

For example, if a certain switch must be taken out of service, it is merely replaced in the table with suitable substitutes. The switch is then effectively taken out of service because it is no longer selected. If the CPU loading of a certain switch reaches a threshold, its presence in the tables can be diminished and distributed to other switches.

In another example, if it is busy hour in region A, the tables may yield network elements in region B to process the call. This can be accomplished by adding an area code or a dialed number entry, and time of day entry in the table. For calls placed from an OPC in region A to an area code or dialed number in region B, a narrowband switch in region B could be selected. As such, the DPC yielded by the table during this time frame should reflect a region B narrowband switch. Also, for calls placed from an OPC in region B to an area code or dialed number in region A, the tables should provide the DPC of a region B narrowband switch.

In a preferred embodiment, IAM messages would cause the CCP to query an SCP, data element, or database for support. The SCP would answer the query by using tables as discussed above. The answers would be sent to the CCP and used to formulate signaling. Subsequent messages would be then handled by the CCP using the CIC table. An example of such support would be for the CCP to query the SCP in response to receiving an IAM message. The query may include the OPC, CIC, DPC, and the area code, or dialed number. The SCP could use this information to select network characteristics and avoid busy regions as described in the above busy region example. For example, the SCP would maintain tables for OPC—dialed area code—time of day combinations that would yield a new DPC and CIC. This assumes that busy hour in a region corresponds to time of day, but other factors and yields could also be involved.

In one embodiment, the dialed number or area code could be used to select the new DPC, and time stamps could be placed in the signaling. This might entail tables with OPC—dialed area code entries that yield a new DPC and CIC. In this case, narrowband switches may not even be needed since billing can be applied using the time stamps. The CCP could then route the call directly using only the broadband network. This is especially relevant for POTS calls in which only an area code entry would need to be added to the tables.

As discussed above, often a connection will consist of two separate connection procedures. One connection procedure will be from the origination to a selected network element. The other connection procedure will be from the selected network element to the destination. Also it has been disclosed that the CCP could actually be discreet machines located regionally. In these cases, the CCP device processing the first connection procedure could be located in the origination region, and the CCP device that processes the second connection procedure could be located in the region of the selected network element.

The present invention offers the advantage of separating at least a portion of the communication control from the communication path. By examining and translating signaling independently of the communication path, multiple switches and network elements can be connected in the optimum way. Communications paths are no longer limited to only the connections the switches can control. Networks do not have to wait for standardization among signaling and interface protocols.

The present invention allows for the selection of network characteristics, such as network elements and connections, before switches process or apply the signaling. The switches are not required to have a capability either to make selections or to signal each other. The switches only make connections as directed by the CCP which signals in each switches own signaling format. Various criteria can be used for the selections in the CCP, such as time of day, load balancing, or invalid ANI. As such, the present invention allows for a smooth transition from narrowband to broadband networks. It also allows for the selection of network elements, such as servers and enhanced services platforms.

The present invention represents a fundamental and powerful departure from previous telecommunications technology. By separating the communications path from communication control, the CCP can utilize different networks and network devices intelligently. Previously, telecommunications systems have been dependent on the switches to accomplish communication control. As such, telecommunications systems have had to wait for the switches to develop communication control before new technology could be implemented. Switches have always been required to physically make connections and provide control over which connections are required. Switch capabilities have not been able to keep up with all of the network possibilities available. The result is a limited system.

Switches have been given support in this dual task. SCPs, STPs, and adjunct processors provide support for communication control. However, these devices only support the switches communication control, and the switch remains essential to communication control. This dependence has created a bottleneck given the available network possibilities.

One advantage of the present invention is that it allows narrowband switches be used interchangeably in a narrowbandibroadband hybrid network. Any narrowband switch may be taken out of service without re-routing traffic and changing routing logic in each switch. The CCP is simply programmed not to select the given narrowband switch for call processing. The CCP will route calls over the broadband network to another narrowband switch. This flexibility also allows the telecommunications network to easily transfer narrowband switch loads.

An important advantage of this system is that both the advantages of broadband and narrowband systems are utilized. The transmission capabilities of a broadband network are coupled with the narrowband network's ability to apply features. For example, the CCP can use the broadband network to substantially make the call connection from origination to destination. The CCP diverts the traffic to the narrowband network for processing. The narrowband network can apply features, such as billing and routing. Once processed, the traffic is directed back to the broadband network for completion of the connection. The CCP can then use the routing information generated by the narrowband system to route the traffic through the broadband system to the destination. As a result, the telecommunications system does not have to develop a billing or "800" routing feature for its broadband network. This can be accomplished because the CCP allows both networks to work together intelligently.

Another advantage of the present invention is the elimination of a substantial percentage of the DS0 ports required on the existing narrowband switches. In the current architectures, narrowband switches are interconnected to each other. A substantial percentage of the switch ports are taken up by these connections. By eliminating the need for the switches to connect to each other, these ports can be eliminated. Each narrowband switch is only connected to the broadband system. This architecture requires fewer ports per switch. By load balancing with the CCP, the number of ports required on busy switches can be reduced. The architecture in the present invention does require additional broadband ports, but these can be added at a significant cost saving versus narrowband ports.

Additionally, the narrowband switches no longer signal each other since all signaling is directed to the CCP. This concentration accounts for a reduction in required signaling link ports. This reduction possibly could result in the elimination of STPs.

As mentioned above, an advantage of the present invention is its ability to treat narrowband switches, or groups of narrowband switches, interchangeably. The CCP can pick any narrowband switch to process a particular call. This allows the network to pull narrowband switches out of service without taking extreme measures. In turn, this simplifies the introduction of new services into the network. A switch can be pulled out of service simply by instructing the CCP to stop selecting it. The switch can be re-programmed and put back into service. Then the next switch can then be updated in the same manner until all of the switches are implementing the new service. Switches can also be easily pulled to test developing applications.

This narrowband switch flexibility also allows the CCP to balance switch loads through the network during peak times, or during mass calling events. This eliminates the need to implement complex and expensive load balancing features in the narrowband network. Instead of programming the several switches to balance among themselves, one command to the CCP can achieve this.

Another advantage is the reduction in call set-up time. Most large networks require that a call pass through more than two narrowband switches arranged in a hierarchical fashion. One large network employs a flat architecture in which all narrowband switches are interconnected, but this still requires that the call pass through two narrowband switches. In the present invention, only one narrowband switch is required for each call. The use of broadband switches to set-up and complete the call represents significant time savings.

What is claimed is:

1. A method for handling communications, the method comprising:

(a) receiving the communications into a first device;

(b) receiving information related to the communications into a first processor that is external to the first device;

(c) processing the information in the first processor to generate a first message and transmitting the first message from the first processor, wherein the first message is configured to cause the first device to transfer the communications to a second device;

(d) processing the information in the first processor to generate a second message and transmitting the second message from the first processor;

(e) receiving the second message into a second processor that is external to the second device;

(f) processing the second message in the second processor to generate a third message and transmitting the third message from the second processor, wherein the third message is configured to cause the second device to transfer the communications;

(g) receiving the first message into the first device and transferring the information to the second device; and (h) receiving the communications and the third message into the second device and transferring the communications.

2. The method of claim 1 wherein at least one of the devices is an Asynchronous Transfer Mode (ATM) switch.

3. The method of claim 1 wherein at least one of the devices is an Asynchronous Transfer Mode (ATM) multiplexer.

4. The method of claim 1 wherein at least one of the devices is comprised of an Asynchronous Transfer Mode (ATM) multiplexer and an ATM switch that are connected together.

5. The method of claim 1 wherein at least one of the devices is a packet switch.

6. The method of claim 1 wherein at least one of the devices is a server.

7. The method of claim 1 wherein the information related to the communications is a Signaling System #7 Initial Address Message.

8. The method of claim 1 further comprising generating a Signaling System #7 Initial Address Message in the second processor and transmitting the Signaling System #7 Initial Address Message from the second processor.

9. The method of claim 1 wherein the communications comprises voice communications.

10. The method of claim 1 wherein the communications comprises data communications.

* * * * *

UNITED STATES PATENT AND TRADEMARK OFFICE
CERTIFICATE OF CORRECTION

PATENT NO.    : 6,104,718
DATED         : August 15, 2000
INVENTOR(S)   : Joseph Michael Christie It is certified that error appears in the above-identified patent and that said Letters Patent is hereby corrected as shown below:

Title page,
Page 6, second column,
Section 56, References Cited, OTHER PUBLICATIONS, delete lines 3 through 38, "U.S. application No. 08/562,206, filed Nov. 22, 1995," through "U.S. application No. 09/464,295, filed Dec. 15, 1999."

Signed and Sealed this

Twenty-fifth Day of September, 2001

Attest:

NICHOLAS P. GODICI
Attesting Officer
Acting Director of the United States Patent and Trademark Office